US010567431B2

(12) United States Patent
Vissamsetty et al.

(10) Patent No.: US 10,567,431 B2
(45) Date of Patent: Feb. 18, 2020

(54) EMULATING SHELLCODE ATTACKS

(71) Applicant: Attivo Networks Inc., Fremont, CA (US)

(72) Inventors: Venu Vissamsetty, San Jose, CA (US); Navtej Singh, Punjab (IN); Sachin Kajekar, Bangalore Karnataka (IN)

(73) Assignee: ATTIVO NETWORKS INC., Fremont, CA (US)

( * ) Notice: Subject to any disclaimer, the term of this patent is extended or adjusted under 35 U.S.C. 154(b) by 549 days.

(21) Appl. No.: 15/157,082

(22) Filed: May 17, 2016

(65) Prior Publication Data

US 2016/0261631 A1 Sep. 8, 2016

Related U.S. Application Data

(62) Division of application No. 14/458,065, filed on Aug. 12, 2014, now abandoned.

(Continued)

(51) Int. Cl.
*H04L 29/06* (2006.01)

(52) U.S. Cl.
CPC .......... *H04L 63/1491* (2013.01); *H04L 63/08* (2013.01); *H04L 63/145* (2013.01);
(Continued)

(58) Field of Classification Search
CPC . H04L 63/1491; H04L 63/08; H04L 63/1416; H04L 2463/144; G06F 21/554
(Continued)

(56) References Cited

U.S. PATENT DOCUMENTS 7,225,468 B2 * 5/2007 Waisman ............ H04L 63/0236 705/51
8,131,281 B1 * 3/2012 Hildner ............... H04L 41/0806 455/418
(Continued)

FOREIGN PATENT DOCUMENTS

WO WO 10030169 A2 3/2010

OTHER PUBLICATIONS

Boxuan Gu, et al. "Malicious Shellcode Detection with Virtual Memory Snapshots," 2010 Proceedings IEEE Infocom, San Diego, CA, 2010, pp. 1-9. Accessed, Mar. 6, 2019, doi: 10.1109/INFCOM.2010.5461950 (Year: 2010).*

*Primary Examiner* — Saleh Najjar
*Assistant Examiner* — Feliciano S Mejia
(74) *Attorney, Agent, or Firm* — David R. Stevens; Stevens Law Group

(57) ABSTRACT

A system includes one or more "BotMagnet" modules that are exposed to infection by malicious code. The BotMagnets may include one or more virtual machines hosing operating systems in which malicious code may be installed and executed without exposing sensitive data or other parts of a network. In particular, outbound traffic may be transmitted to a Sinkhole module that implements a service requested by the outbound traffic and transmits responses to the malicious code executing within the BotMagnet. In the case of shellcode attacks, unsuccessful attacks may be emulated by selecting a corresponding emulator that will receive and execute instructions, as would a successful shellcode attack. Events occurring on the BotMagnet and Sinkhole are correlated and used to characterize the malicious code. The characterization may be transmitted to other computer systems in order to detect instances of the malicious code.

20 Claims, 14 Drawing Sheets

Related U.S. Application Data

(60) Provisional application No. 61/989,965, filed on May 7, 2014.

(52) U.S. Cl.
CPC ...... *H04L 63/1408* (2013.01); *H04L 63/1416* (2013.01); *H04L 63/1441* (2013.01); *H04L 2463/142* (2013.01); *H04L 2463/144* (2013.01)

(58) Field of Classification Search
USPC ....................................................... 726/22–25
See application file for complete search history.

(56) References Cited

U.S. PATENT DOCUMENTS

| | | | | |
|---|---|---|---|---|
| 8,413,241 | B2 | 4/2013 | Weeks et al. | |
| 8,443,442 | B2 * | 5/2013 | Wang | H04L 63/1441 709/226 |
| 8,474,044 | B2 * | 6/2013 | Zawadowskiy | G06F 21/564 726/23 |
| 8,539,578 | B1 * | 9/2013 | Zhou | G06F 21/566 726/22 |
| 8,984,637 | B2 * | 3/2015 | Karecha | G06F 21/52 713/188 |
| 9,043,920 | B2 * | 5/2015 | Gula | H04L 63/1433 709/224 |
| 9,213,838 | B2 * | 12/2015 | Lu | G06F 21/563 |
| 9,270,690 | B2 * | 2/2016 | Kraitsman | H04L 63/1408 |
| 9,305,165 | B2 * | 4/2016 | Snow | G06F 21/53 |
| 9,386,034 | B2 * | 7/2016 | Cochenour | H04L 63/145 |
| 9,877,210 | B1 * | 1/2018 | Hildner | H04W 24/00 |
| 10,284,591 | B2 * | 5/2019 | Giuliani | H04L 63/1441 |
| 2004/0172557 | A1 * | 9/2004 | Nakae | H04L 63/0227 726/22 |
| 2013/0133072 | A1 | 5/2013 | Kraitsman et al. | |
| 2014/0250524 | A1 * | 9/2014 | Meyers | G06F 21/554 726/22 |
| 2015/0074810 | A1 * | 3/2015 | Saher | H04L 63/1466 726/23 |

* cited by examiner

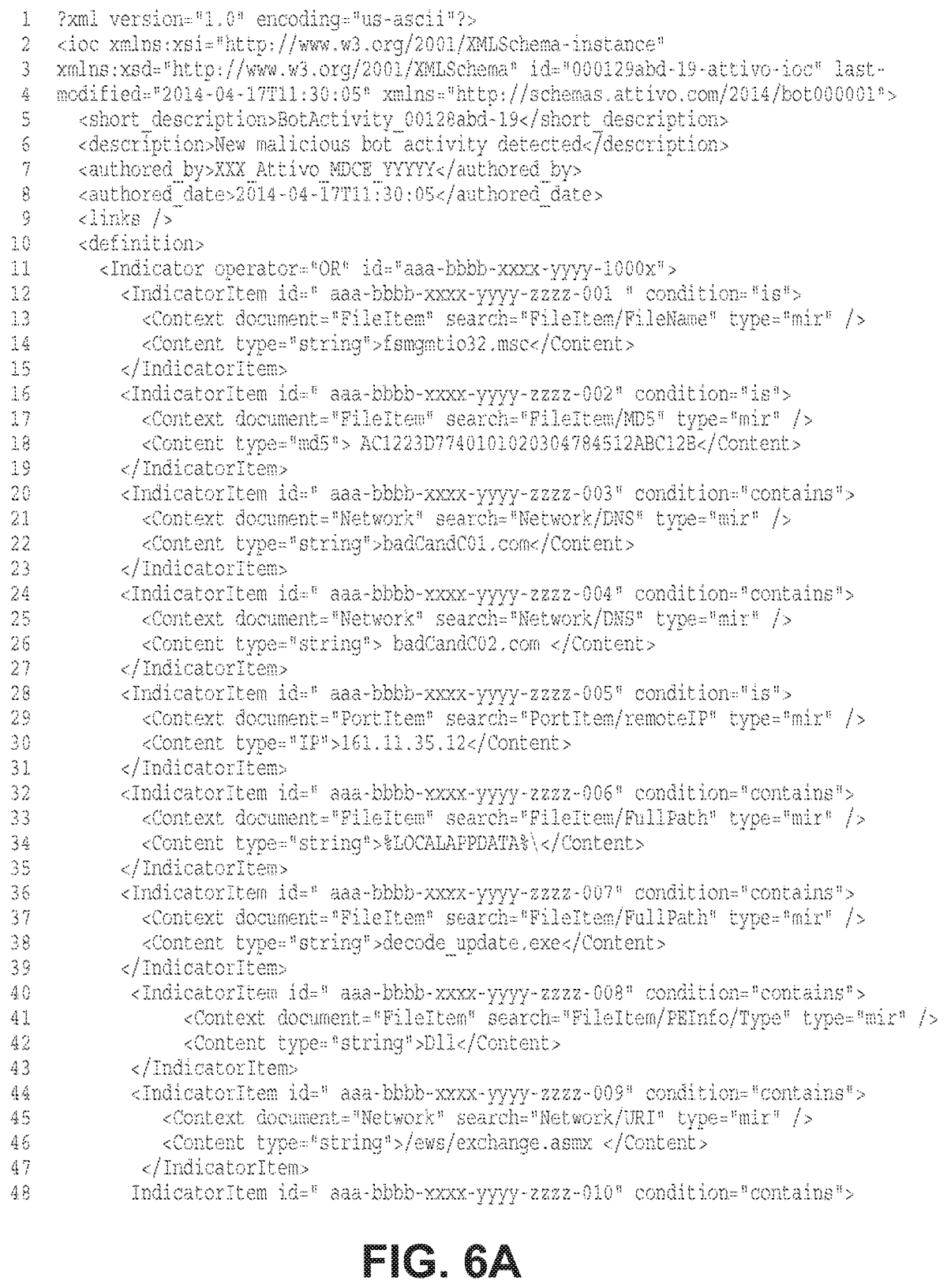

```
?xml version="1.0" encoding="us-ascii"?>
<ioc xmlns:xsi="http://www.w3.org/2001/XMLSchema-instance"
xmlns:xsd="http://www.w3.org/2001/XMLSchema" id="000129abd-19-attivo-ioc" last-
modified="2014-04-17T11:30:05" xmlns="http://schemas.attivo.com/2014/bot000001">
  <short_description>BotActivity_00128abd-19</short_description>
  <description>New malicious bot activity detected</description>
  <authored_by>XXX_Attivo_MDCE_YYYYY</authored_by>
  <authored_date>2014-04-17T11:30:05</authored_date>
  <links />
  <definition>
    <Indicator operator="OR" id="aaa-bbbb-xxxx-yyyy-i000x">
      <IndicatorItem id=" aaa-bbbb-xxxx-yyyy-zzzz-001 " condition="is">
        <Context document="FileItem" search="FileItem/FileName" type="mir" />
        <Content type="string">fsmgmtio32.msc</Content>
      </IndicatorItem>
      <IndicatorItem id=" aaa-bbbb-xxxx-yyyy-zzzz-002" condition="is">
        <Context document="FileItem" search="FileItem/MD5" type="mir" />
        <Content type="md5"> AC1223D7740101020304784512ABC12B</Content>
      </IndicatorItem>
      <IndicatorItem id=" aaa-bbbb-xxxx-yyyy-zzzz-003" condition="contains">
        <Context document="Network" search="Network/DNS" type="mir" />
        <Content type="string">badCandC01.com</Content>
      </IndicatorItem>
      <IndicatorItem id=" aaa-bbbb-xxxx-yyyy-zzzz-004" condition="contains">
        <Context document="Network" search="Network/DNS" type="mir" />
        <Content type="string"> badCandC02.com </Content>
      </IndicatorItem>
      <IndicatorItem id=" aaa-bbbb-xxxx-yyyy-zzzz-005" condition="is">
        <Context document="PortItem" search="PortItem/remoteIP" type="mir" />
        <Content type="IP">161.11.35.12</Content>
      </IndicatorItem>
      <IndicatorItem id=" aaa-bbbb-xxxx-yyyy-zzzz-006" condition="contains">
        <Context document="FileItem" search="FileItem/FullPath" type="mir" />
        <Content type="string">%LOCALAPPDATA%\</Content>
      </IndicatorItem>
      <IndicatorItem id=" aaa-bbbb-xxxx-yyyy-zzzz-007" condition="contains">
        <Context document="FileItem" search="FileItem/FullPath" type="mir" />
        <Content type="string">decode_update.exe</Content>
      </IndicatorItem>
       <IndicatorItem id=" aaa-bbbb-xxxx-yyyy-zzzz-008" condition="contains">
           <Context document="FileItem" search="FileItem/PEInfo/Type" type="mir" />
           <Content type="string">Dll</Content>
       </IndicatorItem>
       <IndicatorItem id=" aaa-bbbb-xxxx-yyyy-zzzz-009" condition="contains">
         <Context document="Network" search="Network/URI" type="mir" />
         <Content type="string">/ews/exchange.asmx </Content>
        </IndicatorItem>
       IndicatorItem id=" aaa-bbbb-xxxx-yyyy-zzzz-010" condition="contains">
```

FIG. 6A

```
        <Context document="Network" search="Network/SNMP" type="mir" />
        <Content type="string"> PASS@WORD </Content>
      </IndicatorItem>
       IndicatorItem id=" aaa-bbbb-xxxx-yyyy-zzzz-011" condition="contains">
        <Context document="Network" search="Network/SNMP" type="mir" />
        <Content type="string"> COMMUNity01 </Content>
      </IndicatorItem>
       IndicatorItem id=" aaa-bbbb-xxxx-yyyy-zzzz-012" condition="contains">
        <Context document="Network" search="Network/SNMP" type="mir" />
        <Content type="string"> COMMUNity01 </Content>
      </IndicatorItem>
     <IndicatorItem id=" aaa-bbbb-xxxx-yyyy-zzzz-013" condition="contains">
        <Context document="Snort" search="Snort/Snort" type="mir" />
        <Content type="string"> alert tcp $HOME_NET 21 -> $EXTERNAL_NET any (msg:"
       FTP Brute Force Login attempt"; flow:from_server,established;
       content:"530 type threshold, track by_dst, count 10, seconds 120; sid:102353; r
       ev:10;)
       </Content>
      </IndicatorItem
      </Indicator>
      <Indicator operator="AND" id=" aaa-bbbb-xxxx-yyyy-zzzz-004">
        <IndicatorItem id="4bba1235-f621-40f7-b34f-8c340d9de7ad" condition="contains">
          <Context document="RegistryItem" search="RegistryItem/Path" type="mir" />
          <Content type=
               "string">Software\Microsoft\Windows\CurrentVersion\Run</Content>
        </IndicatorItem>
        <Indicator operator="OR" id=" aaa-bbbb-xxxx-yyyy-zzzz-015">
          <IndicatorItem id="d4e9da77-60dd-4243-9d14-3460b1d90dd2"
               condition="contains">
            <Context document="RegistryItem" search="RegistryItem/Value" type="mir" />
            <Content type="string">\Windows NT\svchost.exe</Content>
          </IndicatorItem>
          <IndicatorItem id=" aaa-bbbb-xxxx-yyyy-zzzz-016" condition="contains">
            <Context document="RegistryItem" search="RegistryItem/Value" type="mir" />
            <Content type="string">\Windows NT\svclogon.exe</Content>
          </IndicatorItem>
        </Indicator>
      </Indicator>
    </Indicator>
  </definition>
</ioc>
```

FIG. 6B

EMULATING SHELLCODE ATTACKS

RELATED APPLICATIONS

This application is a divisional application of U.S. application Ser. No. 14/458,065 filed Aug. 12, 2014, and entitled EMULATING SHELLCODE ATTACKS, which claims the benefit of U.S. Provisional Application Ser. No. 61/989,965, filed May 7, 2014, and entitled DISTRIBUTED SYSTEM FOR BOT DETECTION, both of which are hereby incorporated herein by reference in its entirety.

BACKGROUND information technology a shellcode is a small piece of machine code that is used as payload and used to exploit software vulnerabilities. The name "shellcode" is derived because the exploitation can result in a command shell that the attacker can connect and control the compromised machine. Attackers normally use shellcode to exploit zero-day vulnerabilities. There are two common types of shellcode. First, a local shellcode which an attacker exploits a vulnerability and the shellcode can download and execute malware on the machine. Second, an attacker or a compromised machine (Bot) wants to target a vulnerable process on a remote machine. The attacker injects shellcode in various protocol and input fields to gain remote access (shell) of the target machine. There are two ways the attacker wants to establish connections with compromised machine (a) The attacker exploits and drops a shellcode known as bindshell where the shellcode binds to a certain port the attacker can connect to (b) The attacker exploits and drops a shellcode known as reverse shell which connects back to attacker's machine. FIG. 7A explains shellcode attacks on remote machines. For the shellcode attack to be successful attackers must execute shellcode on unpatched machines. If the machines are patched or are not running the intended application then it is not possible to run shellcode on target machines. Honeypots are decoy systems that are deployed within production environment to lure attackers and learn their malicious behavior. Honeypots can be used to detect shellcode attacks and learn the intent of the attacker by engaging the attacker. In order for honeypots to be successful they must host vulnerable services across multiple applications and services. There are number of protocols (FTP, SSH, SMTP, HTTP etc.) and various applications that are available and deployed within an enterprise (ex: There are multiple flavor's of FTP servers ProFTPd, Pure-FTPd, vsftpd, wu-ftpd, Glftpd etc and multiple versions of FTPd servers (1.9, 2.0, 2.1, 2.2 etc) that are deployed). Some of these may be vulnerable to shellcode attacks.

The systems and methods disclosed herein provide an improved approach for characterizing and preventing shellcode attacks.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 6A and 6B illustrate an example schema generated in accordance with an embodiment of the present invention;

DETAILED DESCRIPTION

Figure 1:
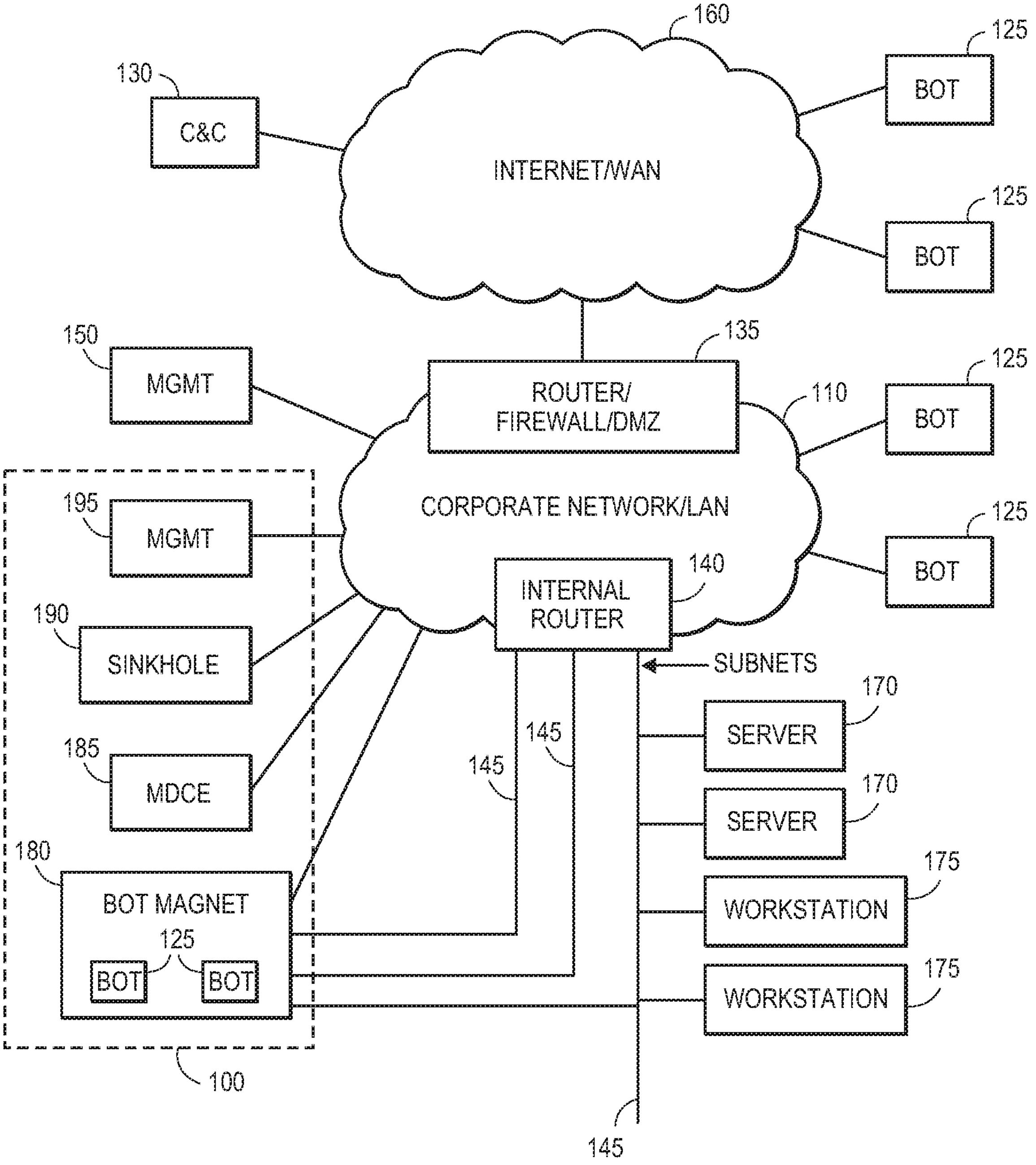
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Conventional honeypots have limitations and shortcomings in areas related to methods of data collection, engagement, detection, supporting multiple operating systems (OSes), services and applications, scaling, number of subnets and IP addresses watched, tapping information from the cloud as well from other sources, correlating multi-dimensional events, identifying Bots, generating incident reports, and are not generally designed to integrate with other existing security solutions in the cloud The systems and methods disclosed herein provide an improved bot-detection system that addresses the foregoing limitations of conventional approaches. In one embodiment, virtualization is used to host multiple guest operating systems (GuestOSes) implementing honeypots that provide various types of network services and applications for addressing Bots, logging insider bad behavior, and performing advanced persistent threat (APT) detection.

In one example, a bot-detection system architecture is configured to scale in terms of the number of subnets and total number of IP addresses supported. In another example, a Bot-detection system can be deployed in an enterprise, perimeter, DMZ (referred to in the art metaphorically as the demilitarized zone, because it is meant to isolate the corporate network from potential outside attackers) and/or cloud. In one embodiment, the Bot-detection system architecture may be configured in a single network appliance, referred to herein as the Botsink.

One embodiment is configured to perform novel identification and analysis of Bots and characterizing specific Bot behaviors in real time, allowing Bots to be detected and characterized quickly and accurately. This allows anti-Bot countermeasures to be put in place quickly and effectively. In yet another embodiment, a Bot-detection system may quickly share learned Bot characteristics among a community of interested or affected network sites. This would improve Bot characterizations and would further allow for installations of countermeasures before more Bot attacks occur.

FIG. 1 illustrates one example of a novel Bot-detection approach according to one embodiment of the invention. A computer network 110 is connected to the Internet 160. The network 110 may be owned and operated privately by a corporation, or may alternatively be owned and operated by government, military, educational, non-profit, or other types of entities. The network will be referred to as a corporate network 110 for simplification of discussion, and those skilled in the art will understand that "corporate" may be substituted with other entity types within the spirit and scope of these descriptions. The corporate network is drawn as a cloud, and particular devices are shown with connections to the cloud, and these connections represent various hardware and software configurations known in the art for communicating among devices. A number of devices including routers, switches, firewalls, security appliances, and other devices may be connected at the interface between the Internet 160 and the corporate network 110. In some configurations, this collection of devices 135 is sometimes referred to metaphorically as the "DMZ", where it is meant to isolate the corporate network from potential outside attackers. Additional network devices may exist inside the corporate network, but not included in this illustration to avoid obfuscation of the drawing and related description.

Bots 125 may be present in the corporate network 110 as well as in the Internet 160. A command and control (C&C) facility 130 operated by the originator of the Bots 125 may also be connected to the Internet 160 and communicate with Bots 125 using the Internet 160, through the corporate network 110, and/or using more sophisticated means intended to hide its whereabouts.

The detailed interconnections of devices with each other and with routers, switches, and the like within the corporate network 110 may be made in a variety of ways. For example, routers such as router 140 may further partition the network into multiple subnets 145 for management, performance, resource allocation, and other purposes. End-devices connect to the subnets 145 and may include servers 170 and workstations 175. A management station or server 150 may be used by network administrators to observe and control the network 110.

In one example, the corporate network 110 may be a local area network (LAN), where its elements are often located at a single geographic site. The Internet 160 is drawn as a cloud, and may be a Wide Area Network (WAN), where it connects geographically dispersed sites.

While elements of a corporate network 110 may be co-located at a single geographic site, they also may be located at multiple sites and connected to each other with private links. In the latter case, the overall network may still be represented as a single "corporate network" cloud 110. If desired, the various examples described herein may be used in such a network to protect against internal threats. This may be done in one example by treating certain internal networks, devices, and services with the same circumspection that is applied to the public Internet in other examples described herein. To avoid obfuscation, the examples described herein will assume that all threats are either connected to the corporate network 110 via the public Internet 160 or located within the local corporate network 110 as shown.

The Bot-detection system 100 may have various configurations depending on particular applications. In one example, a server device called the BotMagnet 180 is attached to one or more subnets 145. A plurality of subnets 145 may be connected to the BotMagnet 180 using one physical interface per subnet, or by combining the subnets onto a smaller number of physical links. In one operational example, the BotMagnet may lure and/or engage with Bots 125. In another example, the BotMagnet may allow Bots to infect it, and may also collect data about the Bots' behavior and characteristics.

The BotMagnet 180 may share collected behavioral or character data with a Multi-Dimension Correlation Engine (MDCE) 185. The MDCE may record and correlate information about the behavior of one or more Bots 125, such as for example multiple instances of the same Bot, and may build a new or augment an existing schema and signature that summarizes the Bots' behaviors and characteristics, as described later in the "Schemas and Signatures" section.

In one example, a Bot 125 may gather local corporate data, and may in turn cause such data to be sent back to other Bots 125, to the C&C facility 130, or elsewhere. The BotMagnet 180 may block such potentially harmful "leaks" of private corporate data, and instead gather it in a device called the Sinkhole 190. Software in the Sinkhole 190 can analyze the characteristics of such data to further enhance Bot detection. It can also optionally substitute innocuous data for the private data in order to prolong Bot engagement without harm. The Bot-detection system 100 may further include a management station or server 195 used by network administrators to observe and control the operation of the system. Secure methods are used, as appropriate, for communication among elements of the Bot-detection system 100. The attributes and manner of operation of the components illustrated in FIG. 1 are described in greater detail below.

Scaling the Bot-Detection System

Referring again to FIG. 1, a Bot-detection system 100 may be attached to, e.g. in data communication with, a number of subnets in a corporate network 110. The Bot-detection system need not connect to all of the subnets in the corporate network, but the system's Bot-detection effectiveness may be improved by connecting to as many subnets as possible. In a large network, it may be desirable or necessary to deploy a larger Bot-detection system in disparate locations. Reasons to deploy a larger system include performance (a corporate network may receive too much attack traffic for a small system to handle), co-location (network may extend over a corporate campus or multiple geographical sites), and ease of management (physically located with different equipment clusters or managed by different departments). For example, if the network 110 has several internal routers 140, each of which partitions the network into subnets 145, then it may be desirable to deploy multiple BotMagnets 180, with each one handling all or a subset of the subnets 145 created by one internal router 140.

The MDCE 185 may or may not be replicated in a larger Bot-detection system. In one embodiment, a separate MDCE 185 may be associated with and receive Bot behavioral information from each BotMagnet 180.

However, Bot detection is enhanced if the MDCE can collect and correlate Bot behavioral information from as many sources (BotMagnets 180) as possible, thereby increasing the generality and accuracy of Bot-detection schemas/signatures. Thus, in another embodiment, a single MDCE may collect such information from all the BotMagnets.

Figure 2:
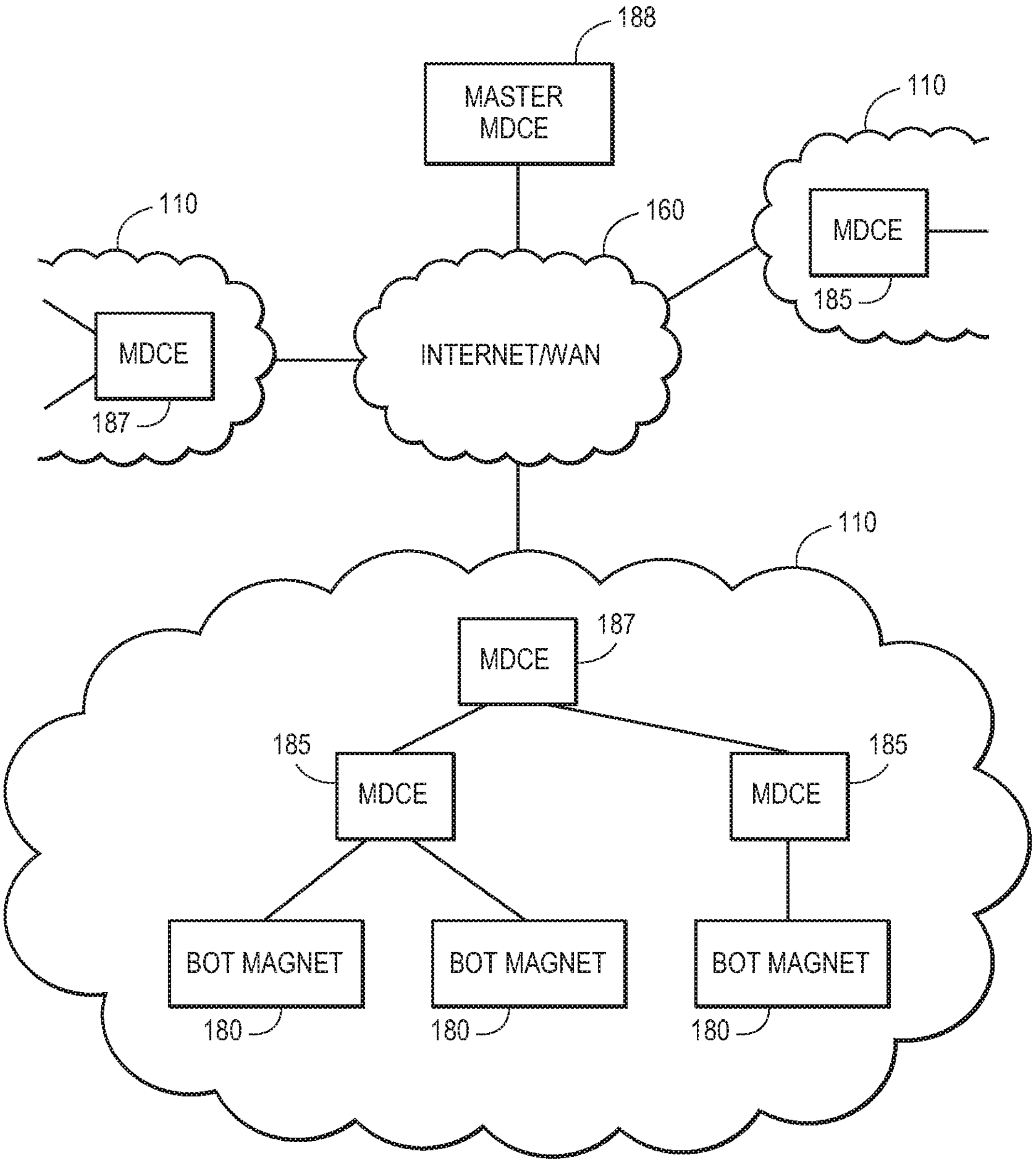
FIG. 2 is a schematic block diagram showing components for implementing methods in accordance with an embodiment of the present invention.

In yet another embodiment, Bot behavioral information may be collected and correlated in a hierarchical way, as shown in FIG. 2. Each first-level MDCE 185 may collect and correlate Bot behavioral information from one BotMagnet 180, or a small number of BotMagnets 180. A second-level MDCE 187 may then collect and further correlate summaries of Bot behavioral information from the first-level MDCEs 185.

The hierarchy may be further extended. In particular, it is possible for an MDCE 185 or 187 to communicate through the Internet 160 with other MDCEs serving other corporate networks 110, for the beneficial purpose of sharing information about new Bot attacks. Such sharing could be done strictly hierarchically, with a "master, top-level" MDCE 188 existing somewhere in the cloud or within a corporate network 110 and maintaining a master database of Bot behavioral information. In some embodiments, advantageously, multiple MDCEs 185 or 187 may have a peer-to-peer relationship, much like the one that exists among other internet devices for distributing routes, providing domain-name services, and the like—continuously updating each other with respect to content generated according to the methods described herein by using methods understood by one skilled in the art.

Referring again to FIG. 1 and to scaling of the Bot-detection system 100, the Sinkhole 190 may also be replicated, with each Sinkhole 190 serving one or a small number of BotMagnets 180. The degree of replication may be dictated by performance requirements, co-location convenience, and other factors.

The Management Station or Server 195 may be replicated. Within a corporate network 110, it is typically desirable to centralize network management. This would suggest managing as many Bot-detection systems 100 with a common Management Station or Server 195, or even integrating system 100 management with an existing, overall Network Management Station or Server 150. But for performance, organizational, or other reasons, it may be desirable to provide a separate Management Station or Server 195 for each Bot-detection system 100, as will be understood by one skilled in the art. As will be understood, this is possible and a hierarchical approach again may be employed.

Virtual Machines (VMs)

A Virtual Machine (VM) is known in the art as an implementation of a computer that operates like a single, standalone computer, but in fact is one of a plurality of such implementations running on a single hardware platform.

Historically, the first VMs were pure software implementations; recent years have seen the development of both hardware and software to support easy and efficient deployment of VMs on the latest generations of microprocessors. VMs may be deployed on microprocessors containing a single hardware processor (CPU), as well as on microprocessors containing multiple processors.

A collection of VMs operating on a single microprocessor may be created and controlled by a low-level operating system called a hypervisor. Each VM is in turn controlled by a traditional operating system (OS), which is typically unaware that it is running in a VM rather than on a single, standalone computer. Different VMs on a single microprocessor may run different OSes, and different applications may run on each. VMs controlled by a single microprocessor are typically isolated from each other and cannot communicate with each other using traditional memory sharing and other techniques. Rather, they must communicate with each other through a "network." However, they need not actually communicate over the physical network. Rather, the hypervisor can create simulated networks or "bridges" through which they can communicate, with the hypervisor arranging internally to transfer data from one VM to another.

In one embodiment, a BotMagnet 180 may use a VM to host a GuestOS that appears to be a real server 170 or workstation 175, insofar as other devices in the network are concerned. Using multiple VMs, the BotMagnet 180 can take on the appearance of being multiple servers 170 and workstations 175 at different IP addresses running multiple applications and services for the purpose of luring Bots 125, detecting them, and analyzing their behavior. Further, the BotMagnet 180 may use one or more additional VMs to host its own protected software for overall BotMagnet control and Bot detection and analysis.

The Sinkhole 190 may also include or be embodied by one or more VMs each programmed to receive and analyze the outgoing traffic from GuestOSs that are engaged with Bots 125 within a BotMagnet 180. For example, the sinkhole 190 may implement one VM for each GuestOS that is engaged with a Bot.

Basic Bot-Detection System Operation

The BotMagnet 180 may have one or more interfaces for communicating with subnets 145 in the corporate network 110. The network administrator or some other network management module (e.g. a dynamic host configuration protocol (DHCP) module) configures the BotMagnet 180 with one or more otherwise unused IP addresses from the subnets 145, e.g. assigns an IP address to the BotMagnet by which packets may be addressed to the BotMagnet 180. The network administrator may use the Management Station/Server 195 to perform such configuration. The BotMagnet 180 then may create a GuestOS VM corresponding to each such IP address. Thus, each GuestOS VM may have its own IP address, and through the Hypervisor may also be assigned its own unique MAC address for layer-2 network connectivity. Thus, each GuestOS VM, for all outward appearances, may behave like an independent physical computer communicating at its assigned IP address. Each GuestOS VM is an instance of an operating system, which may be a different OS or version thereof on different VMs. Each GuestOS VM is also loaded with a set of applications, such as web applications and services, which again could be different on different VMs. OSes, applications, and services may be configured either by the network administrator or automatically by the Management Station/Server 195 to ensure that the BotMagnet is hosting an appropriate mix of potentially vulnerable software.

Applications and services existing on a GuestOS VM (or on any server or workstation, for that matter) are accessed by potential clients when clients access them through the network interface. A typical application or service may be accessed using a well known protocol such as TCP or UDP and a "port number" such as SMTP (25), HTTP (80), RLOGIN (513), FTP (20-21), or one of many others. If a computer does not offer a particular application or service, it may discard incoming traffic directed to the corresponding port. Otherwise, it directs such traffic to the appropriate application or service program. Thus, a GuestOS may accept only inbound traffic corresponding to the applications and services that have been configured on it.

Bots 125 and other malicious entities perform "port scans" on target networks in order to find available applications and services, and then engage with them with the goal of finding vulnerabilities that can be exploited to gain further access to the target. A port scan typically attempts communication with all of the IP addresses that might be used in the target network, and for each IP address it attempts all of the port numbers for which it may be able to find a vulnerability.

Thus, if a large proportion of a network's IP addresses are assigned to the Bot-detection system 100, and a large number of applications and services are offered there, there is a high probability that a Bot's port scan will soon encounter a GuestOS VM in the Bot-detection system where its behavior will be recorded and subsequently analyzed.

The Bot-detection system 100 is designed to attract Bots 125 and allow them to infect GuestOS VMs, so that behavioral details of Bot operation can be recorded and subsequently analyzed. The GuestOSes in the BotMagnet 180 may have no special mechanisms to prevent Bot infections. Indeed, Bot infections are desired.

Consider a Bot 125 that is able to communicate with a GuestOS VM through the FTP port. It may try to download an executable file such as a copy of itself into the GuestOS file system, and subsequently try to execute it. If these operations would have been allowed by the GuestOS, applications, and services running on a real computer, they will be allowed on the GuestOS VM. The GuestOS VM therefore becomes infected.

Bot operations on a GuestOS VM may advantageously be contained such that they cannot actually harm the corporate network 110 and the devices attached to it. Because of the Bot's containment in a VM, it can be prevented from doing any direct harm. To understand how this is done in some embodiments, the concepts of "inbound" and "outbound" traffic on a VM should first be understood. Inbound traffic is traffic from an external entity that results in the VM taking internal actions, such as allowing the entity to log in or run a service or program, or accepting data that is sent to it, such as storing a file that has been downloaded by the external entity. Outbound traffic is traffic in which the VM sends potentially private data to an external entity. For example, a web page that is normally visible to all external entities is not considered private, while an arbitrarily selected file may be considered potentially private. A basic principle of operation for a GuestOS VM is that it may allow and act upon all inbound traffic from external entities, while it may block all outbound traffic directed to external entities.

For example, suppose the Bot 125 now running within the infected GuestOS VM tries initiate its own port scan of the corporate network, or tries to transfer a file back to its C&C facility 130 using FTP. The BotMagnet 180 may be programmed such that no outbound traffic can be sent from a GuestOS VM to the corresponding connected subnet 145.

Thus, the consequences of the infection are effectively blocked, no matter how bad things may look inside the infected GuestOS VM.

On the other hand, it may not be possible to fully record and analyze the behavior of a Bot 125 unless it is allowed to continue its engagement in a meaningful way. The Sinkhole 190 is the system component that makes this possible in some embodiments. For selected inbound traffic, the BotMagnet 180 may be configured to forward such traffic to the Sinkhole 190, which may contain one or more VMs corresponding to each GuestOS VM of the BotMagnet 180 with which it is currently engaged. Each Sinkhole VM may further configured with the applications and services that it is expected to handle.

For example, if a Sinkhole VM is expected to handle HTTP traffic, then it could be configured with an Apache Web Server. Outbound traffic from the Apache Web Server may then be sent back to the requester (such as a Bot 125 elsewhere in the corporate network 110 or Internet 160). The web pages and other information visible through this server would be configured in much the same way as in a conventional honeypot, in order to lure a Bot 125 to engage further without disclosing anything of value. This provides an opportunity to record and analyze the further behavior of the Bot 125 on an infected target.

The MDCE 185 receives extensive log information from both the GuestOS VMs and the Sinkhole VMs, as well as certain information gleaned by the BotMagnet's control software (which manages the VMs). Thus, the MDCE is able to track the engagement and profile the entire lifecycle of a Bot 125. Once the Bot's behavior has been profiled in a schema/signature, the MDCE 185 may create an alert notifying the network administrator, and optionally may distribute the schema/signature to potential victim servers 170 and workstations 175 in the network. As is understood in the art, after receiving an alert, the network administrator may take steps to prevent further infection, such as blocking the attacker at the network DMZ/firewall. Also, upon receiving a schema/signature describing the new threat, anti-virus/malware software running on a potential victim can take automatically take action when a matching behavior is detected, as is understood in the art. To discover already infected victims, a network administrator can invoke thorough virus/malware-scanning operations to be run on each potential victim, and/or can use standard software tools to examine their log files for behavior patterns that match the schema/signature, as is also understood in the art.

The Bot-detection capabilities of the system 100 are enhanced by the system's ability to capture and correlate events occurring both in the GuestOS VMs when an infection begins, and in the Sinkhole VMs, as the consequences of an infection begin to occur. However, embodiments of the invention are possible with no Sinkhole 190 or no BotMagnet 180.

For example, operating without a Sinkhole 190, it is still quite feasible for a GuestOS VM in the BotMagnet 180 to send log information to the MDCE 185, which can correlate information from this and other GuestOS VMs in order to build a profile, albeit a less extensive profile than what could be done in a complete system. Yet such a system still has the advantage of creating such profiles from multiple infected GuestOS VMs and subnets, and such profiles may also be correlated with Bot information gleaned from other facilities.

Conversely, operating without a BotMagnet 180, it would still be possible for real servers 170 and workstations 175 to be configured with software that collects behavioral information such as logs and sends it to the MDCE 185 for correlation with other information as before. Further, if the real server 170 or workstation 175 is "suspicious" about any activity, for example based on its origin or behavior pattern, it may forward the session to the Sinkhole 190 for engagement, in much the same way that a BotMagnet GuestOS VM would as described above. In this case, the MDCE can build a more complete profile, because it can correlate behavioral information from both the originally targeted real server 170 or workstation 175 and the Sinkhole 190.

In yet another example, embodiments could be combined with application Ser. No. 14/074,532 filed Nov. 7, 2013, which is incorporated herein by reference in its entirety. The Inspector 255 in that application, instead of redirecting blocked traffic to a Labyrinth 257 or 258, could redirect it to a GuestVM OS in the BotMagnet 180 or directly to the Sinkhole 190. One or more GuestVM OSes and corresponding Sinkhole VMs may be instantiated to handle such traffic, either by configuration or dynamically as needed. As the MDCEs 185, 187, and 188 in present invention are designed to share information with other MDCEs and security services, they could also share information as appropriate with the Cloud Inspection Service (CIS) 262 in application Ser. No. 14/074,532.

For robust operation of the Bot Detection System 100, communication among the BotMagnet 180, the MDCE 185, the Sinkhole 190, and the Management Station or Server 195 should be secure. Conventional methods may be used to encrypt such communication. Also, it is important to ensure that the MDCE 185 and the Management Station or Server 195 cannot become infected, and that BotMagnet 180 and the Sinkhole 190 can become infected only within the GuestOS and Sinkhole VMs as desired, and not within their supporting VMs and processes. This can be ensured, in part, by using secure, private communication between these elements, for example by using secure tunnels. In the Botsink appliance, described next, most of such communication privacy is inherent because communication occurs internal to the appliance.

BotSink Appliance Architecture

Figure 3:
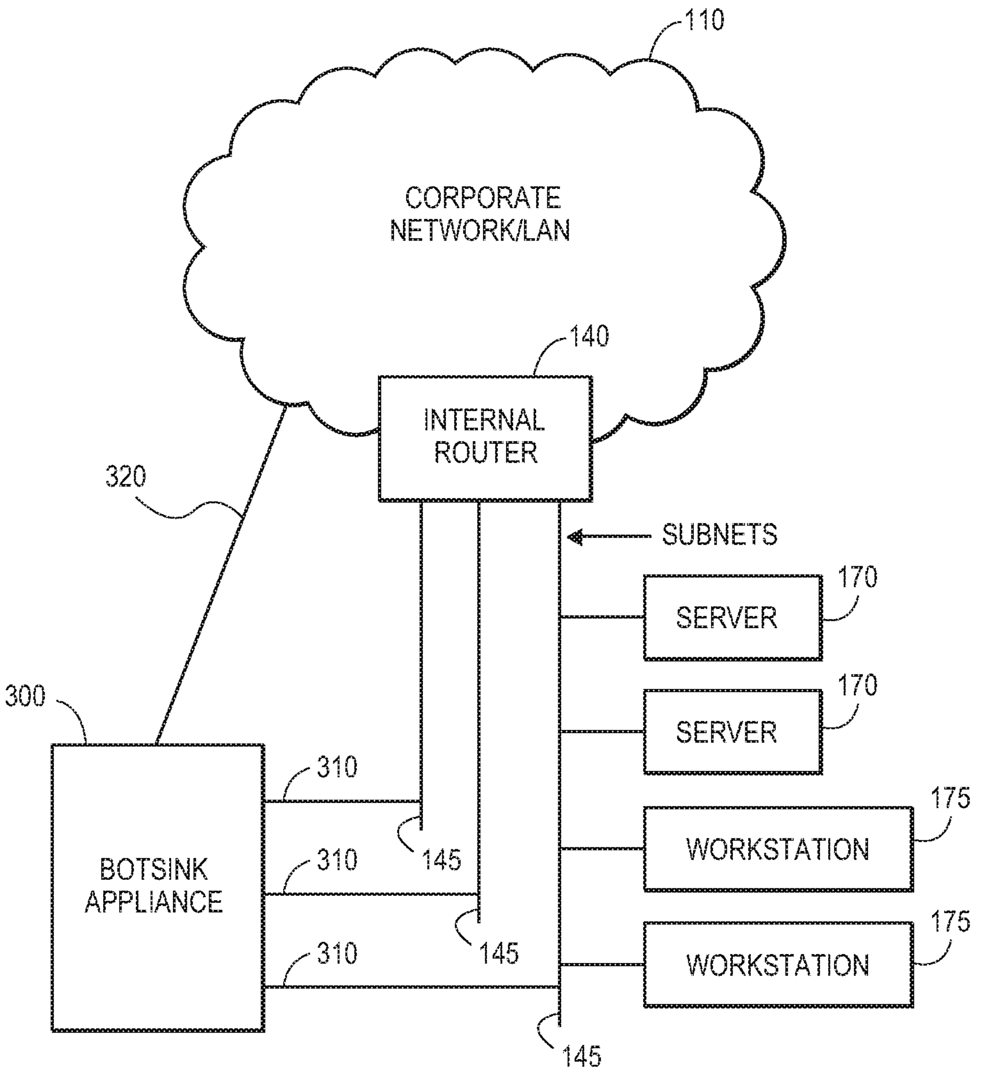
FIG. 3 is a schematic block diagram showing integration of components with a corporate network in accordance with an embodiment of the present invention.

In a preferred embodiment, the Bot-detection system 100 is integrated into a single network-connected device, called the BotSink appliance. As shown in FIG. 3, the BotSink appliance 300 connects to multiple subnets 145, using one or more physical interfaces 310 as discussed previously in connection with FIG. 1. BotSink appliance 300 may also connect through an interface 320 to the corporate network 110 for the purposes of communicating with other BotSinks or standalone MDCEs 185 or 187, Management Stations or Servers 195 or 150, and for any other required purpose. Secure communication is used as appropriate. The interface 320 to the corporate network may or may not use the same physical link(s) as the subnet interface(s) 310.

Figure 4:
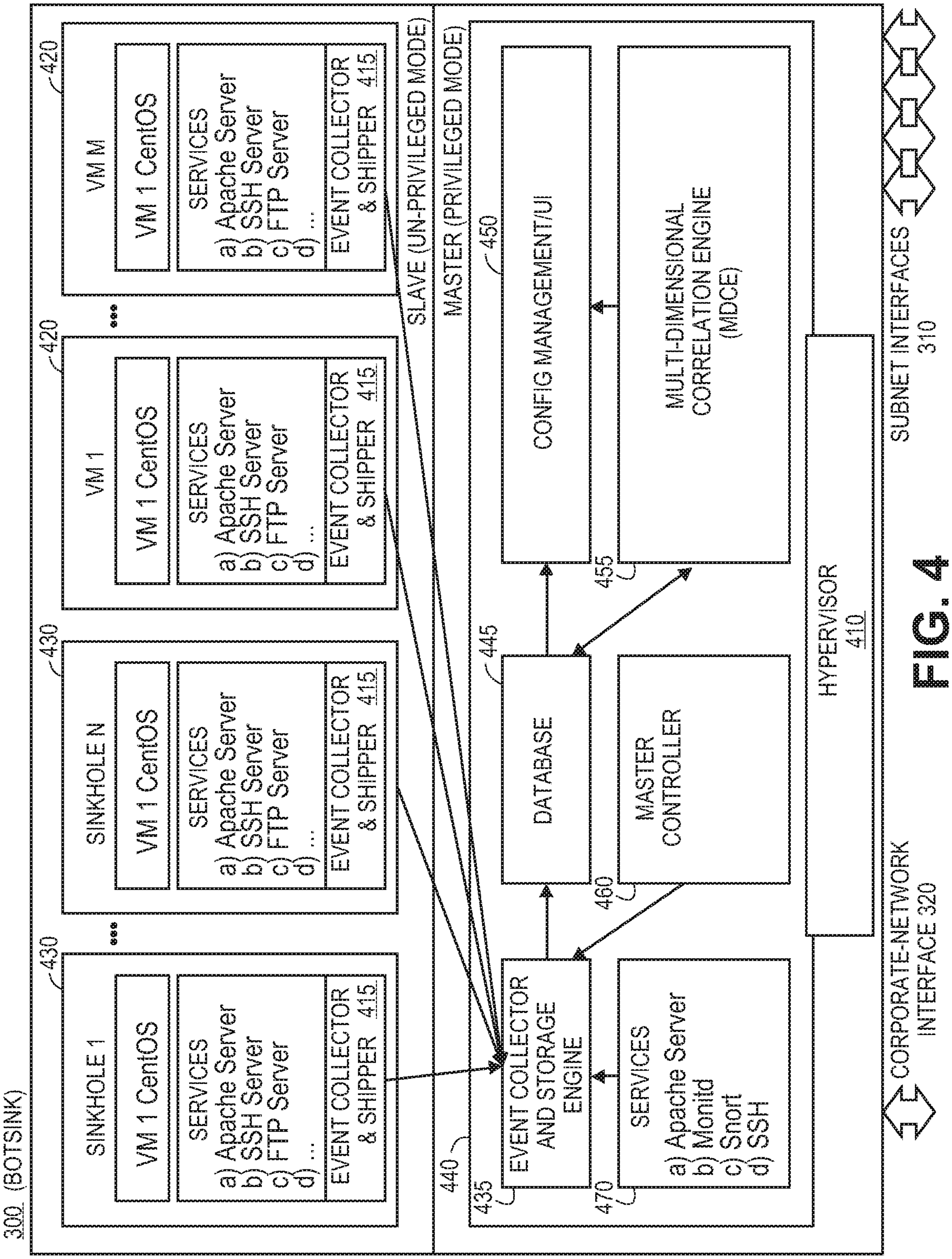
FIG. 4 is a schematic block diagram illustrating virtual machines and other components implemented in accordance with an embodiment of the present invention.

FIG. 4 shows major software components of the BotSink 300. It hosts multiple GuestOSes with multiple services to lure bots and uses distributed processing both for data/traffic collection and analysis. The appliance supports multiple interfaces, both physical and virtual interfaces, that can be plugged into different parts of the physical/virtual networks. The unique features and capabilities of the BotSink appliance are based on a distributed architecture comprising the following components running in multiple VMs:

1. The Hypervisor 410 that provides virtualization.
2. GuestOS VMs 420 for loading different types and instances of operating systems and performing some or all of:

a. Running various network and applications services
b. On some or each of the GuestOS VM the following set of services may be run:
i. Log collection across various modules
ii. Transformation of the raw logs into well defined formats
iii. Forwarding events to a centralized location handled by Log Shipper.
3. Sinkhole VMs 430 to be the destination for selected traffic originating from each of the Guest VMs. 3. The sinkhole VMs 430 perform some or all of the following:
a. Confining traffic with in the appliance.
b. Running various network and applications services for engaging with Bots.
c. Event collection, transform and shipping module 415.
d. Proxy module for engaging with C&C and other traffic communication for a real world interaction.
4. Events Collector and Storage Engine 435 may perform some or all of the following:
a. This module is responsible for receiving some or all the events from various components running on the different GuestOS and Sinkhole VMs.
b. Some or all of the events are stored in a database 445 for further analysis by the Multi-Dimension Correlation Engine.
c. This includes log rotation, threshold-based cleanup and so on.
5. Multi-Dimension Correlation Engine (MDCE) 455 to correlate events for Bot detection. The MDCE may perform some or all of the following:
a. This is a component for Bot detection, the engine responsible for correlating the event data and generating meaningful results for detection of Bots. It processes events from individual hosts and generates schemas, signatures, and alerts by means of correlation.
b. Actions may be taken/driven based on the results of the correlation. Running the correlation may be event-driven and also may be run at regular intervals.
c. The Bot detection rate is high since many individual events can be collected from the GuestOS and Sinkhole VMs.
d. Exchanges information with higher-level MDCEs and other services in the corporate network and/or the Internet for global analytics.
e. Taps into the cloud (Internet) for getting real-time information or metadata about BlackList IP address, URLs, virus signatures, social media and crowd-sourced information, and information from security devices and other sources.
6. Master Controller 460 performs some or all of:
a. Running in the Privileged Mode, this software has total control over each of the GuestOS and Sinkhole VMs instantiated.
b. Manages, creates and destroys VMs, bridges, and other resources.
c. Monitors to ensure all the applications and services are running as necessary.
d. Manages connectivity of VMs to each other and the network, for example, prevents outbound traffic from a GuestOS VM 420 from going out on a subnet interface 310, and redirects it as required to a Sinkhole VM 430.
7. UI for configuration and reporting 450
a. Forwarding of alerts to other Security devices.
8. Additional security and monitoring services 470 may be used by MDCE 455, UI 450, Master Controller 460, and Event Collector 435.

FIG. 4 shows two GuestOS VMs 420, each of which may run one or more network services and applications such as FTP Server, Apache-based HTTP server, SSH server and so on. Any number of GuestOS VMs may be provided, subject to performance and other resource limitations. On each of the GuestOS VMs, there may be an Event Collector and Shipper 415 that collects events, logs them, and forwards them to the Event Collector and Storage Engine 435. Likewise, two Sinkhole VMs are shown, but any number may be provided to service outbound traffic from the GuestOS VMs 420. The Sinkhole VMs 430 may likewise include one or more web services and resources as the VMs 420 and may likewise include an event collector and shipper 415.

In FIG. 4, the bottom set of software modules 440 ("Master") may be running in Privileged Mode and have higher privileges configured by the Hypervisor 410, compared to the "Slave" GuestOS and sinkhole VMs that run in Unprivileged Mode. The Slave software modules may be off-the-shelf software such as standard releases of various operating systems, web services, applications, and utilities such as event loggers.

Software modules 4-8 listed above may run in a single VM, while in some embodiments they may advantageously be split among a plurality of VMs. As such, they are protected from any of the other VMs. These components may run in Privileged Mode, which means they have access to the Hypervisor 410 to create, destroy, and otherwise access, control and monitor VMs, bridges, and other resources, while in some embodiments the GuestOS of VMs 420 and Sinkhole 430 VMs cannot.

Some or all outbound traffic originating from any of the GuestOS VMs 420 may be either dropped or redirected to a Sinkhole VM 430, thus initially confining potential outbound traffic within the appliance, e.g. system 100. The Sinkhole VM may then allow selected traffic to be passed as is, modified or substituted and returned to the requester (such as a Bot 125) so that engagement may proceed in a harmless manner.

Multiple strategies and methods may be used to harden the Master software modules so that they do not get infected or become targets of an attack. Also, a GuestOS VM 420 being infected may advantageously have no impact on any of the other system components or other VMs, in terms of the CPU usage, resources, and so on, nor on the Master software modules.

Typical System Operation

Figure 5A:
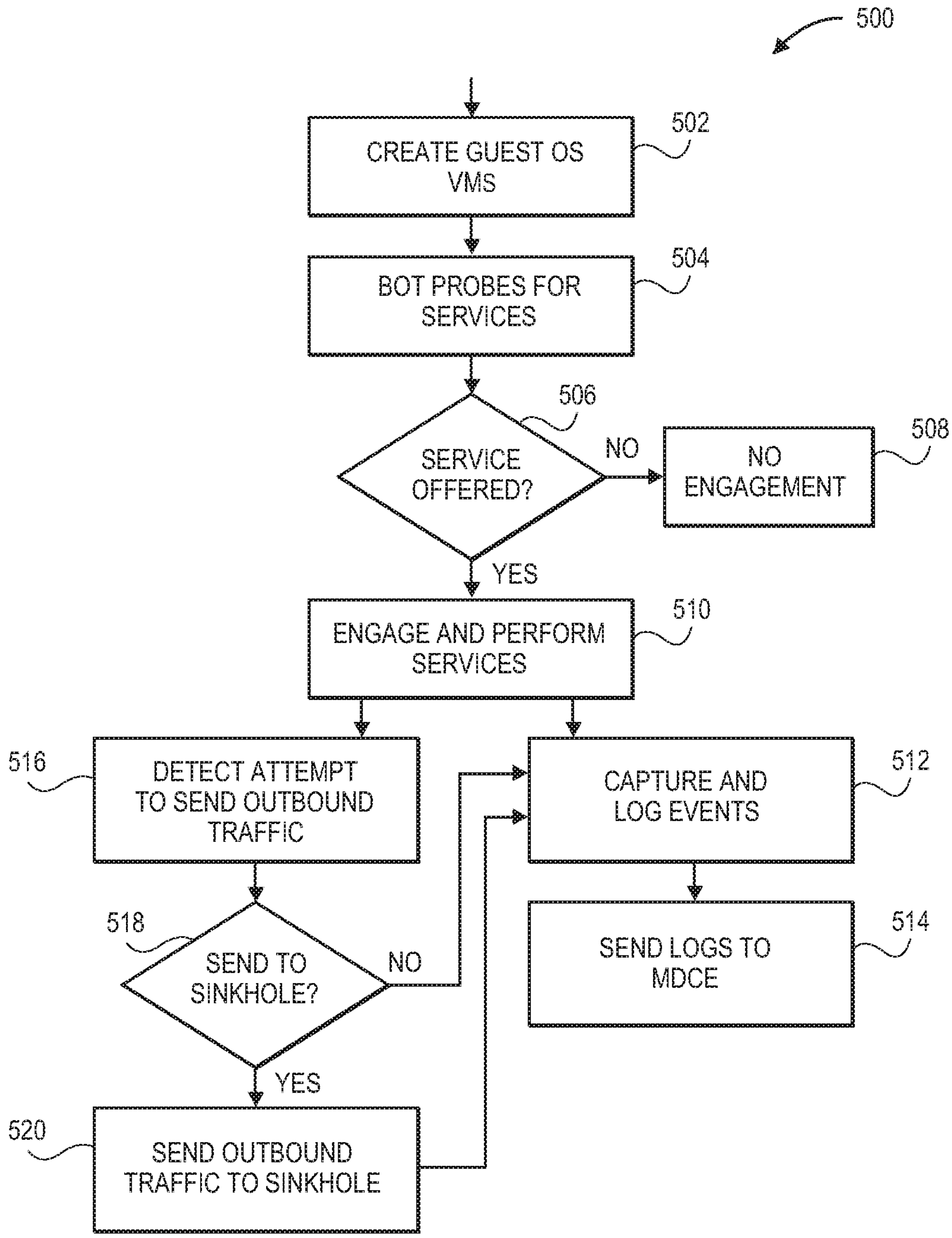
FIGS. 5A through 5C are process flow diagrams methods for responding to bots in accordance with an embodiment of the present invention.

FIG. 5A is a flowchart showing an example method 500 of operation of the BotMagnet 180 in a Bot Detection System 100 or BotSink appliance 300. In step 502, GuestOS VMs in the BotMagnet 180 are created and configured to offer various services, applications, and databases. In step 504, a Bot 125 is performing a port scan using the IP (internet protocol) address of one of the GuestOS VMs and is probing for services offered at that IP address. The Bot 125 may be located in the Internet 160, or it may be inside the corporate network 110, running on a server 170 or workstation 175 that has been infected.

In step 506, the Bot 125 is attempting to access the service at a particular port number. If the GuestOS VM does not offer 508 the service it logs the probe, but there is no engagement 508 with the Bot. Logging the probe is useful for automatically detecting port scans. If the service is offered, the Bot is allowed to engage with the GuestOS VM, and the service is performed in step 510. In this step, all of the communication and other activity normally associated with the service occurs.

A typical Bot, once engaged with a service or application on a victim system, looks for vulnerabilities that may allow it exploit the victim system, for example, by downloading, installing, and running an executable file. The executable file typically contains a program that may be able to initiate outbound traffic, and it may be a copy of the original Bot 125 itself, as the Bot attempts to spread itself laterally across the network. Thus, a copy of the Bot 125 may be running inside one or more GuestOS VMs in the BotMagnet 180, as was shown in FIG. 1.

During the engagement, agents in and associated with the GuestOS VM capture and log events in step 512. This step may be performed periodically, e.g. be substantially a continuous activity, that may take place in parallel with the normal activity of the service being performed in step 510. Periodically, or on the occurrence of particular events (such as the Bot attempting to send outbound traffic for the first time), in step 514 activity logs may be sent to the MDCE 185 for correlation with other events logged elsewhere.

During the engagement in step 510, the Bot may attempt to send various types of outbound traffic. One type may be an attempt by the Bot to contact its C&C facility 130. Another type may be an attempt to perform a port scan on other servers 170 and workstations 175 in the local network or beyond, and to infect any vulnerable ones that are found. Yet another type of outbound traffic may be an attempt to send files or other sensitive information (such as passwords, security keys, configuration information, and the like) to the C&C facility 130 or elsewhere.

In step 516, an attempt to send outbound traffic from the GuestOS VM is detected. Like step 512, step 516 is a periodic, e.g. substantially continuous activity, that may take place in parallel with the normal activity of the service being performed in step 510. Ensuring that outbound traffic is blocked or redirected may typically be a function of the Master Controller 460 software module running in Privileged Mode in the BotMagnet 180 or the BotSink 300. In step 518, a decision is made by such software whether to block such traffic or to redirect it to a Sinkhole VM in step 520. In either case, the activity is logged in step 512 for eventual sending to the MDCE in step 514.

When sending of outbound traffic is attempted for the first time in a particular GuestOS VM, the blocking and redirecting software may also be responsible for arranging to allocate or instantiate an associated Sinkhole VM and install and run the appropriate services and applications on it; in the present example this operation is performed by the Sinkhole itself, as will be seen next.

Figure 5B:
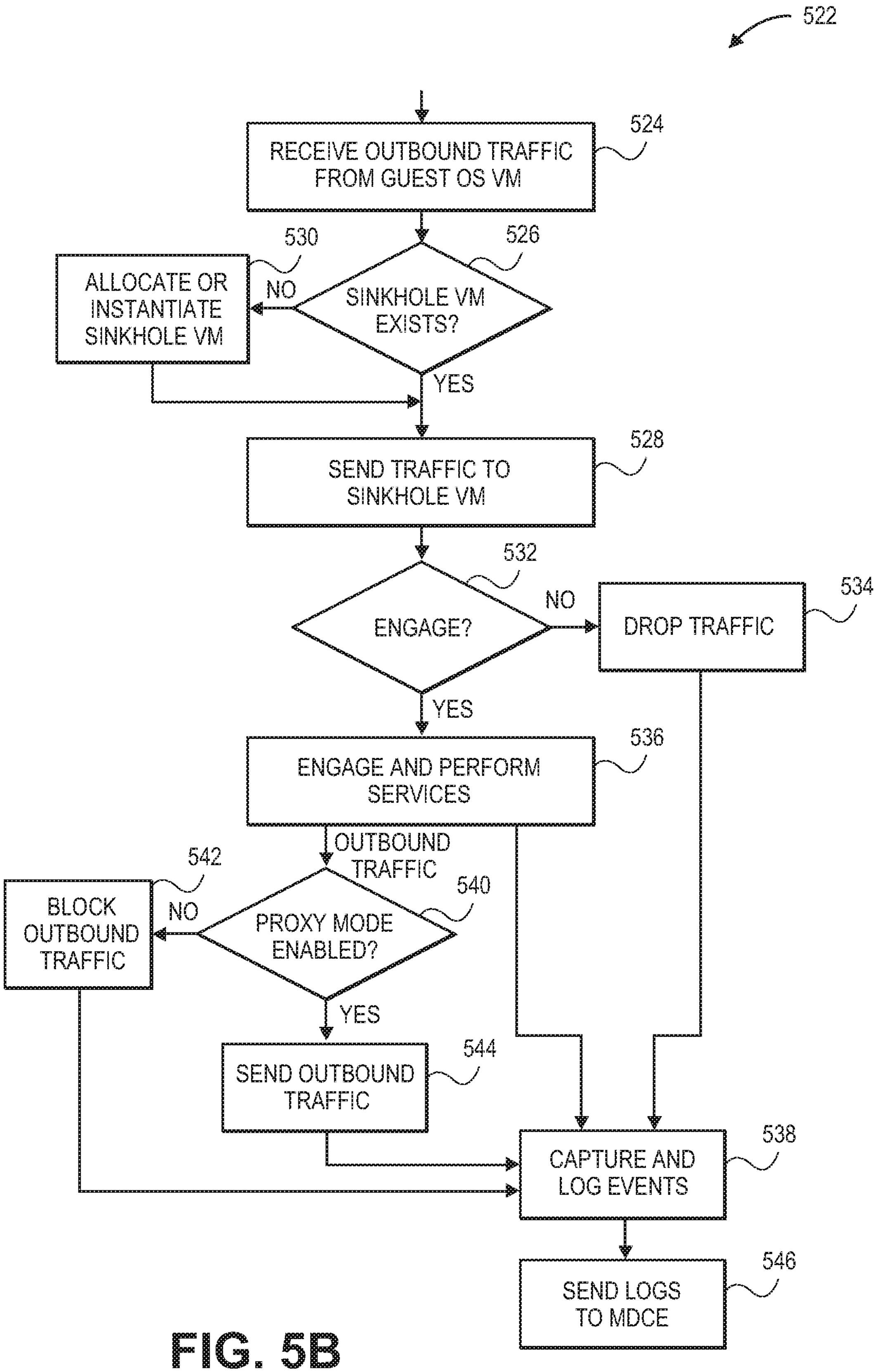

FIG. 5B is a flowchart illustrating an example method 522 of operation of the Sinkhole 190 in a Bot Detection System 100 or BotSink appliance 300. In step 524, the Sinkhole 190 receives outbound traffic from a particular GuestOS VM which has generated outbound traffic and has decided to send it to the Sinkhole 190 rather than drop it, for example in step 520 of FIG. 5A. In step 526, the Sinkhole 190 determines whether it already has a Sinkhole VM that is processing outbound traffic from the particular GuestOS VM and, if so, directs the traffic to that Sinkhole VM in step 528. If not, then in step 530 it either allocates a pre-configured Sinkhole VM from an available pool, or instantiates a new Sinkhole VM and configures it with the services and applications that may be needed for the new engagement. In particular, the outbound traffic may be inspected to determine a service or application referenced by the outbound traffic and that service or application may be provisioned on the Sinkhole VM. Once the Sinkhole VM exists and is ready to accept traffic, step 528 directs the outbound traffic to it.

In step 532, the Sinkhole VM decides whether to engage with the Bot 125. The decision whether to engage is based at least in part on the nature of the outbound traffic. If there is no engagement, then the traffic is dropped 534; otherwise it is forwarded to step 536 for engagement.

Whether or not engagement occurs, events and traffic may be captured and logged in step 538. The logging in step 538 is a continuous activity that takes place in parallel with the normal activity of any engagement being performed in step 536. Periodically, or on the occurrence of particular events (such as determining the name or address of the Bot's C&C facility 130 for the first time), activity logs may be sent to the MDCE 185 for correlation with other events logged elsewhere, e.g. events logged by a GuestOS for the Bot the same Bot that generated the traffic being processed by the Sinkhole VM according to the method 522.

Any kind of engagement may occur in step 536, if the Sinkhole VM is configured with the appropriate services and other software. For example, if the outbound traffic uses the HTTP protocol, the Sinkhole VM may host an Apache web server (e.g. provisioned on-the-fly to host an Apache web server) to respond to the Bot's web-page requests and serve up pages that may trap the Bot into continuing the engagement, giving the Bot detection system 100 more opportunities to learn about and log the Bot's behaviors and what it is ultimately looking for.

In another example, the outbound traffic may be a port scan that has been initiated by the Bot 125 in the GuestOS VM. In this case, the software in the Sinkhole 190 may ensure that all port scans are directed to one or more Sinkhole VMs, e.g. one or more other Sinkhole VMs, that offer various services and applications. Thus, the Bot 125 in the local GuestOS VM may be tricked into engaging with a service running on a Sinkhole VM. This provides more opportunities for the Bot Detection System 100 to observe and log the behavior of the Bot 125, such as according to the methods described herein.

In another example, if the outbound traffic uses the IRC (Internet Relay Chat) protocol, then it is likely to be an attempt by the Bot to communicate with its C&C facility 130. In this case, software in the Sinkhole VM may engage with the Bot using the IRC protocol and attempt to learn valuable information about the Bot. For example, it may be able to learn the URL (uniform resource locator) of C&C facility, or the identity of the Bot. If the outbound traffic includes a DNS request to learn the IP address associated with the C&C's URL, a DNS service in the Sinkhole VM may respond with the IP address of the Sinkhole VM itself, thereby fooling the Bot into communicating directly with the Sinkhole VM as if it were the C&C facility, further enhancing the Sinkhole VM's opportunity to learn and log more details of Bot-C&C interaction.

In yet another example, the Bot may be attempting to send in the outbound traffic corporate data that it accessed in the GuestOS VM. In such a case, the Sinkhole VM may simply maintain the HTTP, IRC, FTP, or other communication and data-transfer channel, and log the data that comes across it for further analysis, e.g. report the data to the MDCE 185 as described above.

In the examples above, the Sinkhole VM continues to prevent the original outbound traffic received from the GuestOS VM from leaving the confines of the Sinkhole 190. However, the Sinkhole VM may be configured to optionally enable a feature called Proxy Mode. When the Sinkhole VM attempts to send outbound traffic as a result of the engagement in step 536, step 540 determines whether Proxy Mode is enabled. If not, then the traffic is blocked in step 542 and logged in step 538. If Proxy Mode is enabled, the Sinkhole VM, with the cooperation of the Master Controller 460 software, may in step 544 allow the original outbound traffic received from the GuestOS VM to exit the Sinkhole 190. The Proxy Mode software may also modify the source IP address and other information in the outbound traffic so that further engagement occurs directly with the engaging software running on the Sinkhole VM, rather than with the GuestOS VM.

Proxy Mode may be especially useful if outbound traffic is determined to be an attempt by the Bot 125 to communicate with its C&C facility 130. Such traffic activity is monitored in step 538 along with other activities of the Bot. Thus, Proxy Mode may be particularly useful for "Bot research." That is, if the Bot Detection System 100 discovers a Bot whose behavior does not match any previously known Bot, network administrators or others may wish to investigate the Bot further to determine what additional exploits it may be capable of, and what kind of information or resource theft it is ultimately seeking. By enabling Proxy Mode in a carefully controlled environment, the network administrators create the opportunity for Bot communication with the C&C facility 130, so that more information on the Bot and the C&C facility may be revealed. In Proxy Mode, it is also possible for the researchers to modify the outbound traffic to the C&C facility to reveal even more information. As for the method 5A, logs of events captured at step 538 may be sent 546 to the MDCE for processing according to the functionality ascribed to the MDCE 455 herein.

Figure 5C:
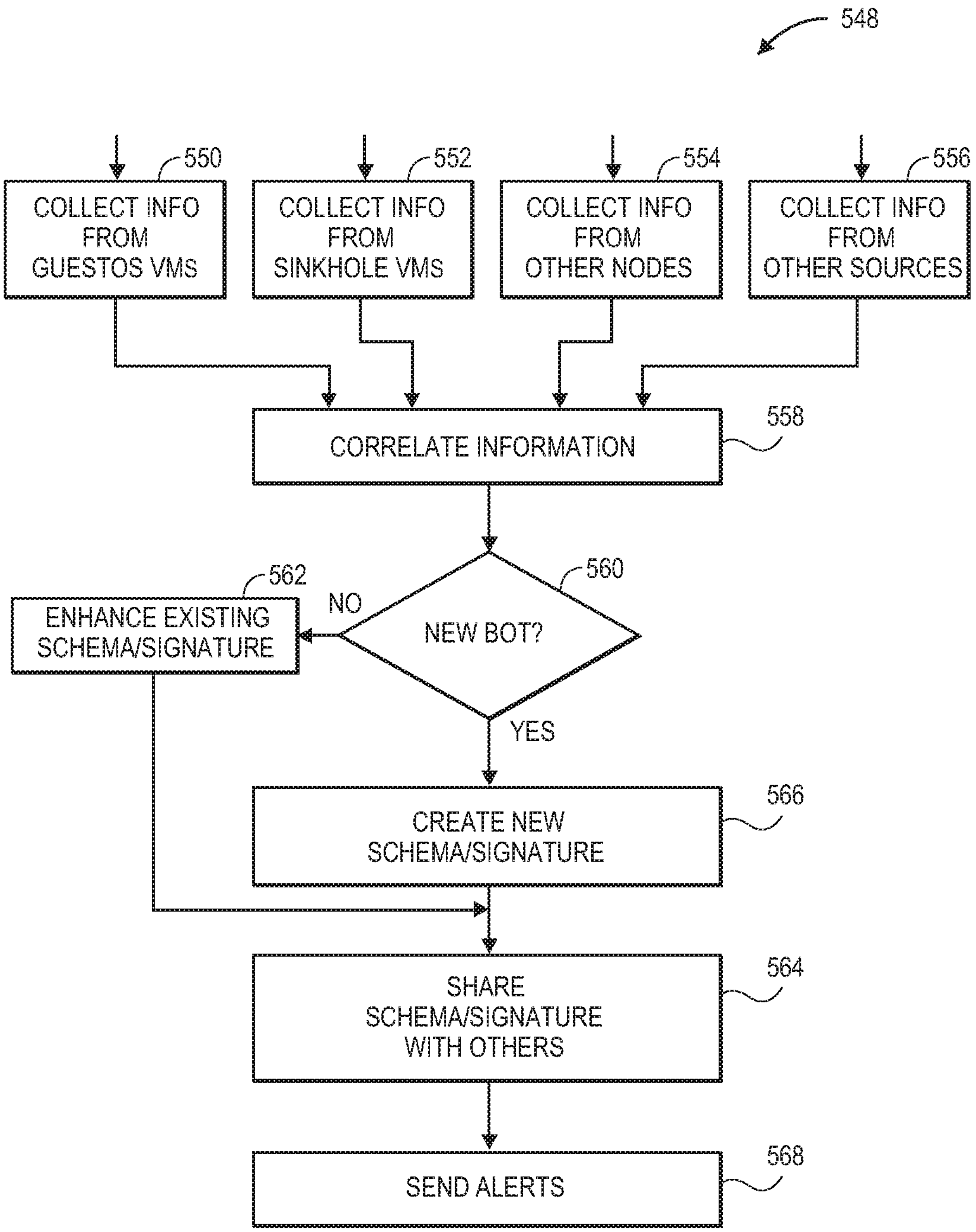

FIG. 5C is a flowchart illustrating an example method 548 of operation of the MDCE 185 in a Bot Detection System 100 or the MDCE 455 software module in a BotSink appliance 300. In step 550, the MDCE collects events and log information from one or more BotMagnets 180. Such information typically may be collected and consolidated from multiple GuestOS VMs and other software on each BotMagnet 180 by a software module such as the Event Collector and Shipper 435 that was described previously in connection with the Botsink 300.

Similarly, in step 552 the MDCE collects events and log information from the Sinkhole VMs and other software running in one or more Sinkholes 190. In step 554, the MDCE collects schemas/signatures and other information from other MDCEs 185, 187, and/or 188. In step 556, the MDCE collects schemas/signatures and other information from other Bot-information sources. Such sources may include publicly accessible services that collect and publish information on known Bots using software such as Snort and formats such as the STIX language to describe IOCs (Indicators of Compromise) and Bot signatures. Such sources may also include privately accessible services with which the operators of the Bot Detection System 100 have cooperation agreements.

In each case above, the events collected are placed into a database where they can be accessed by further steps. In step 558, the MDCE correlates information received from the various sources, to build and enhance Bot schemas/signatures. In particular, it correlates information from each particular GuestOS VM and the associated Sinkhole VM, if any, and determines which information may indicate the presence of a Bot and should be included in a corresponding schema/signature.

In step 560, the MDCE compares a new schema/signature with other schema/signatures in its database and determines whether it may correspond to a new Bot, e.g. a new type of Bot. The other schema/signatures may have been created as a result of other activity in the same Bot Detection System 100, or they may have been received from other MDCEs in step 554 or other sources in step 556.

If step 560 determines that the new schema/signature corresponds to an existing Bot, in step 562 the MDCE may combine the new schema/signature with the existing schema/signature(s) for the same Bot to create an enhanced signature, and update its database accordingly. In step 564, the MDCE may share the enhanced signature, if any, with other MDCEs and publicly and privately accessible Bot-information services.

If step 560 determines that the new schema/signature does not correspond to an existing Bot, in step 566 the MDCE may update its database with the new schema/signature and continue to step 564 to share the new signature with others. It may continue to step 564 immediately or, depending on MDCE configuration or characteristics of the Bot such as potential for damage, it may elect to wait until more activity or more instances of the Bot have been detected.

In step 564, the MDCE may share a new or enhanced schema/signature with Sinkholes 190. Having the ability to access the signatures of both new and previously known Bots may provide useful capabilities in Sinkholes 190. For example, a Sinkhole VM may decide whether or not to enable Proxy Mode or alert a research team depending on whether a Bot that it is engaged with is new or is already well known.

In step 564, the MDCE may also share a new or enhanced schema/signature with servers 170 and workstations 175 that are capable of interpreting such a signature and using it to block any attacks that should be directed at them. For any of the sharing partners above, the MDCE may share some or all of its schema/signature database with others periodically or upon other events, triggers, or requests, not just upon the creation of a new or enhanced schema/signature. In step 568, the MDCE may send alerts to a network administrator and/or others, indicating that a new Bot or an instance of a known one has been detected. If desired, such alerts may be sent earlier in the process, based on configuration or other characteristics of the detected activity, such as the potential for damage.

Schemas and Signatures

As introduced previously, a schema is a multi-element template for summarizing information, and a signature is a schema that is populated with a particular set of values. A schema may have just one or a few elements. However, an aspect of the invention is to base Bot detection not just on one or a few individual events like network behavior or signature but across multiple dimensions across various VMs, services, and applications across multiple subnets. Thus, the schema for describing a particular Bot may have many elements corresponding to the many dimensions, and the values that populate the elements may capture the behaviors of many instances of the Bot. The populated schema may be called a "Multi-Dimension Bot Lifecycle Signature."

These multiple dimensions can be broadly categorized into, but not limited to, the following:

1. Network activity
    a. Transmit packets
    b. Receive packets
2. Connection tracking
    a. Inbound
    b. Outbound 3. Probes/scans
   a. ARP request/ARP response
   b. TCP SYN, TCP Reset, ICMP redirects and so on
4. Network behavior
   a. Time of activity
   b. Burstiness
   c. Amount of data transferred
5. OS related activity
   a. OS system calls
   b. Call stack
   c. Delay or sleep
6. System activity
   a. Registry key changes
   b. Installation of other programs
   c. File drops
   d. Directory creation
7. Application activity
   a. Authentication (involves audit logs)
   b. Usage of resources
8. Application-related backend activity
   a. Database access
   b. Invoking other utilities and programs
9. Log activity
   a. Log file
   b. Utilities like Firewall, iptables, other security programs, antivirus, and so on
   c. Events detected and reported by other security programs
   d. Snort (intrusion detection and prevention system)
   e. Generate new signature both for C&C as well for the traffic generated by the Bots. These signatures can be exported and shared among security devices.

Such activities may be captured on either of the GuestOS VMs and Sinkhole VMs on which they occur or by which they are detected. In some cases, the capturing is accomplished by small agents that are installed with the GuestOS or Sinkhole software, typically monitoring calls to the OS kernel for various services. How to create and install such agents is understood by those skilled in the art. For example, among other things the Linux Audit System has the ability to watch file accesses and monitor system calls (c.opensuse.org/products/draft/SLES/SLES-security_sd_draft/cha.audit.comp.html, Chapter 30, Understanding Linux Audit).

In general, monitored activities may include any of the following:

1. file access
2. file modification
3. file transfers (incoming or outgoing)
4. directory creation/destruction
5. registry queries & modifications
6. new-process creation
7. process destruction
8. input/output, including use of cameras and other peripherals
9. keystroke and mouse capture/logging
10. display activity
11. installation or removal of agents An example of a schema written in XML, is shown in FIGS. 6A and 6B. For the purposes of illustration, this schema has been limited to a few dimensions and has correspondingly few elements. However, the number of and complexity of the elements may be expanded to describe any desired number of Bot lifecycle behavioral dimensions. The elements of the example schema are described in the paragraphs that follow.

The first nine lines of the example schema in FIGS. 6A and B contain identifying information about the schema itself, such as the name, description, creation date, and author of the schema. The definition of the schema begins at line 10.

On line 11, the "OR" operator specifies that matching any of the elements within its scope creates a match of the schema. Other operations such as "AND" can be used, and logical conditions can be nested as desired. The "id" and its value are for identification and tracking purposes and are placed in the schema by its author, the MDCE in the present example.

The first element within the "OR" operator's scope is specified on lines 12-15. This element matches a file whose name matches the string value "fsmgmtio32.msc", which in this schema is the name of a file that may have been accessed or installed by a Bot.

The next element is specified on lines 16-19, and matches a file whose MD5 checksum equals a specified value. Thus, if the Bot installs the same malicious file in different victims, it will still be matched even if a different filename is used. Or, additional elements could be added to the schema to specify additional variations of filename or MD5 checksum in different instances of the Bot.

The next two elements, on lines 20-23 and 24-27, match a DNS lookup for either of two URLs that may correspond to a C&C facility for the Bot. The element on lines 28-31 matches a particular remote IP address that may be associated with the Bot.

The example schema's list of elements continues in this manner, with each element specifying a value to be matched. The element on lines 60-68 is worth pointing out, as it matches an event detected by SNORT software running in the Master, privileged layer of software in a BotMagnet 180, Sinkhole 190, or BotSink 300. The element on lines 69-86 is also worth mentioning, as it is "composite" element involving several values and two logical operations, designed to match a Microsoft Windows registry entry. The registry-item path must match "Software\Microsoft\Windows\CurrentVersion\Run", AND the registry-item value must match "\WindowsNT\svchost.exe" OR "\WindowsNT\svclogon.exe".

The event and the value to be matched in each element may have been logged originally by a GuestOS VM 420, a Sinkhole VM 430, or in some cases by other software modules running on the BotMagnet 180, Sinkhole 190, or BotSink 300. In any case, it is the responsibility of the MDCE 185, 187, or 188 to determine which events may be relevant to a particular Bot and to incorporate appropriate matching elements as it builds or augments the corresponding schema and the values that are matched, thus creating a multi-dimension lifecycle signature for the Bot.

Multi-Dimension Correlation Engine Details

As previously explained, one component of the Bot-Detection System 100 is the multi-dimension Correlation Engine (MDCE) 185, 455. One function of the MDCE may be to correlate multi-dimension individual events collected across various modules across different VMs to generate a multi-dimension schema and signature corresponding to a Bot 125. That is, the MDCE observes Bot behavior and thereby generates a "Bot Lifecycle Signature" using a schema. The MDCE 185, 455 can import various signatures/schemas from other MDCEs 185, 187, and 188 and from the cloud, as well as transform these schemas for export in various standard formats. The MDCE can reduce false positives by dynamic learning and incorporating other information like white lists and so on.

The MDCE can classify as well as group the events according to the type of Bot infection phases such as those described in the section on Lifecycle of Bot Detection.

The MDCE supports importing of data related to one or more Bots from multiple sources and formats as well feed this data to the MDCE, resulting in better detection. Similarly, Bot related data like signatures, traffic, events, pcap (packet capture) and so on can be transformed into various formats for exporting to other systems. Some of the input/output formats supported are listed below:

1. Open Framework for Sharing Threat Intelligence (OpenIOC) format
2. Structured Threat Information eXpression (STIX) format
3. SNORT rules/signatures
4. other industry-standard formats that may exist or be developed
5. customized and proprietary formats Actions Taken on Bot Detection On detection of any infection on any of the Guest OS VMs 420 based on the collection of data and events, the Master Controller 460 software module running in Privileged Mode in the BotMagnet 180 is responsible for taking a set of actions on that particular VM without any user involvement. The list of possible actions includes:

1. Stop the service
2. Cleanup by running different Antivirus utilities
3. Destroy the VM
4. Respin the VM
5. Quarantine the VM for further observation
6. Wait for a predefined timeout value, or as configured by user, and then respin the VM.

In any of these cases any outbound traffic from the infected GuestOS VM 420 may always be dropped by the GuestOS VM or it may be redirected to a SinkHole VM 430 which may send it, may modify and then send it, or may drop it, as was explained previously in connection with FIG. 5B. Hence there may advantageously be no leakage of any outbound traffic from any of the VMs on the BotSink appliance 300.

A Bot's behavior may be similar to one that has been seen before, either by the local MDCE 185, by another MDCE 185, 187, or 188, or by another security service that has shared Bot signatures using a known format. In such a case, the MDCE that has detected the Bot may export the locally constructed signature to these other devices and services to enhance global recognition of the Bot. If the Bot is not recognized—a so-called Day Zero attack—the MDCE may advantageously share the locally constructed signature with other devices and services.

In either case, signatures shared with other MDCEs, devices and services may characterize Bot behavior in much more detail because of unique capability of the Bot-detection system 100 to capture very detailed behavioral information from multiple sources over the entire lifetime of the Bot.

Lifecycle of Bot Detection

This section describes a sample Bot and gives details right from the infection phase to the Command & Control (C&C) communication phase. The lifecycle of a Bot infection process may be classified into five stages, called "Bot infection phases":

1. E1—Inbound scanning—scanning a computer within the network.
2. E2—Exploit—when the inbound scan successfully exploits/gains access to use a computer within the network using various exploit attack vectors.
3. E3—Egg download—downloading a copy of the complete Bot to infect and execute on the exploited computer.
4. E4—Outbound scanning—Infected machine within the network scans machines inside or outside the corporate network for vulnerabilities for infecting more systems.
5. E5—C&C engagement—infected machine contacting the command and control center. (Note: this extract is adapted from http://rise.cse.iitm.ac.in/wiki/images/9/98/Botnet_report.pdf).

The above list of phases may be extended by adding two or more phases, such as:

1. E6—Infection Phase resulting in payload drop onto a new target.
2. E7—Malicious Traffic generation like generating SPAM, DDOS, etc.

On the other hand, it is entirely possible that some Bots may skip a few phases and may execute the phases in a different order. Also some events, like E4 and E5, can happen independently of each other.

This section details and lists multi-dimension events, their processing and their grouping, which results in detection of the sample Bot by the BotSink system 100 or appliance 300. This also includes the subsequent generation of alerts and target client list reporting. The events listed here may be specific to the Botsink system 100 or appliance 300 implementation and follow a generic format used to log each of the events, as shown below:

1. Time Stamp Field: Indicates the timestamp, such as in UTC format, of when this event was captured
2. Event Name: describes the type of event or a module name responsible for this event.
3. Type: subtype of the event, like request/response
4. Protocol: The transport protocol such as TCP, UDP etc.
5. Flags: Protocol specific information.
6. L2: MAC-layer specific information, like MAC address
7. L3 info: IP addresses of both source and destination, and whether IPv4 or IPv6
8. L4 info: port number of source and destination, service info
9. Extended description: Raw or summary description related to event Two examples of events are:

1. <TimeStamp=1222,Event=ARP, type=request, src Ip=123.2.1.3, mac=mm:aa:bb:cc:dd:ee:> (where ARP means Address Resolution Protocol).
2. <TimeStamp=225,Event=Network, Type=TCP, subtype=connection established (Event 023, conn established, client IP=x.x.x.x, destination port=yy, target ip, port etc.) (where TCP is transmission control protocol).

Sample Trace for Bot Called BBB

A Bot installed on a workstation or server initiates a port scan thereby probing to discover new computers for infection to laterally spread itself. The BotSink appliance engages with the Bot by responding to all probes that arrive at each of the GuestOS VMs that it hosts. It also logs these probes. The following set of events are triggered:

1. <TimeStamp=1222,Event=ARP, type=request, Ip=x.x.x.x, mac=mm:aa:bb:cc:dd:ee:>
2. <TimeStamp=1223,Event=ARP, type=response, ip=x.x.x.x, mac=mm:aa:bb:cc:dd:ee:>
3. <TimeStamp=224,Event=Network, Type=TCP, Protocol=TCP, Flags=SYN, srcip="x.x.x.x", srcport=mm", destport="aa", destination ip=y.y.y.y">

4. <TimeStamp=225,Event=Network, Type=TCP, subtype=connection established (Event 023, conn established, client IP=x.x.x.x, destination port=yy, target ip, port etc.).

Based on the response, the Bot determines or further probes to determine a set of services enabled on each of the GuestOS VMs. Bots usually probe some of the set of ports that host standard services, that is, one or more standard, well-known ports looking for services like SMTP, IIS server, HTTP/S, FTP and so on.

The Bot tries to exploit a particular service by running a set of known vulnerabilities against that service. If successful, the Bot tries to take control of the target host by setting up a backdoor by means of a payload drop. The payload is usually an executable program intended to take control of the target. The exploit of this vulnerability as well the payload drop result in generation of the following set of events. In this example the Bot is using a password cracking mechanism for the initial attack vector, and then drops in a payload called mmm.exe.

1. <TimeStamp=2222,“Event”=“Network, 026”, Type=login,027>
2. <TimeStamp=2223,“Event”=“Authentication,31”, username=028, password=028, authentication status=success 029>
3. <TimeStamp=2224,“Event”=“Network”, Eventld=024, data size=453 bytes, Event 044, file name=mmm.exe>
4. <TimeStamp=2225,Event=“Audit”, Audit=file created, permission=xxx, file size=453, file-owner=root, srcip=“x.x.x.x”>
5. <TimeStamp=2226,Event=“APP”, AppType=FTP, srcip=“x.x.x.x”>
6. <TimeStamp=2227“Event”=“OS”, Event Id=061, “Type”=“File Store”, “File Permission”=“execute permission on file”)
7. <TimeStamp=2228,Event=OS”, Type=Exection, mmm.exe:>
8. Snort captures all connection establishments and logs them. Individual network services or applications like FTP and HTTP will log each of the events in /var/log/xxx.
9. <TimeStamp=3222,Event=“APP”, AppType=FTP, srcip=“x.x.x.x”>
10. <TimeStamp=3223,Event=“APP”, AppType=FTP filedrop, srcip=“x.x.x.x”>
11. <TimeStamp=3224,Event=“OS”, AppType=file stored, srcip=“x.x.x.x”>
12. Some or all events are tracked/monitored as being executed by the Bot.
13. <TimeStamp=4222,Event=“Audit”, AuditType=directory created, srcip=“x.x.x.x”>
14. <TimeStamp=4223,Event=“OS”, command=mkdir, srcip=“x.x.x.x”>
15. <TimeStamp=4224,Event=“OS”, AppType=file stored, srcip=“x.x.x.x”>

The Event Collector and Shipper 415 module transforms these as well as other events into a fixed format and sends them off to the Event Collector and Storage Engine 435. It may add relevant information like a host name and the like.

The Event Collector and Storage Engine 435 running in the Privileged Mode may collect some or all events from different VMs hosting different GuestOS and feed them to MDCE 185.

The MCDE may correlate all these individual multi-dimension events, possibly in real-time, to generate one summary alert. The summary alert will be provided to the network administrator with some or all the critical information need to identify the Bot and the infected-targets list. The UI module will provide the network administrator the ability to query all the associated individual events that led to the raising of the summary alert and all other associated data collected as part of individual events.

For Example: <Event=Alert, Priority=1, Severity=1, Description=“Bot BBB detected”, Client IP List=“x.x.x.y”, “x.x.x.x”, file drop name=mmm.exe, protocol=tcp, app=ftp, Related BotInfectionPhaseTransition:Timestamp1:E1, TimeStamp2:E2, TimeStamp3:E3, TimeStamp4:E4, Events=011,0222,233,233,343,234,543,2323,>

Some or all individual events that can be generated by the VMs may be mapped to one or more “Bot Infection Phase” numbers. Based on the “Bot Infection Phase” number it is possible to track what phase a particular Bot infection is in and monitor its progress. The “Bot Infection Phase” number transition and the associated individual events are unique for each of the Bots and hence can be used to create a “Bot Lifecycle Phases Signature”:

1. <scan phase=011, 022, 033>
2. <exploit phase=034, 0455>
3. <payload drop phase=0352, 0459>
4. <outbound scan phase=03498, 045522>
5. <c&c phase=02323,2988,88772>
6. <infect others phase=023343,54343>
7. <exploit traffic generation=0877,0982>

Example of BotInfectionPhaseTransition for Bot BBB may include:

1. Timestamp1:E1
2. TimeStamp2:E2
3. TimeStamp3:E3
4. TimeStamp4:E4,
5. Events=011,0222,233,233,343,234,543,2323

This “Bot Lifecycle Phases Signature” can be shared with other MDCEs, security components, end points, IPS (intrusion prevention system) devices and so on and helps them to quickly identify behaviors seen on those systems as corresponding to Bot activity or not. Based on this information, the Bot can be quickly terminated and threat mitigated, for example, by quarantining devices whose event logs contain events matching the Bot's now-known behavior. It is also possible to safeguard private data at the network level by configuring filters on Internet-connected routers to block all outbound traffic destined for the C&C facility's now known address.

Figure 7A:
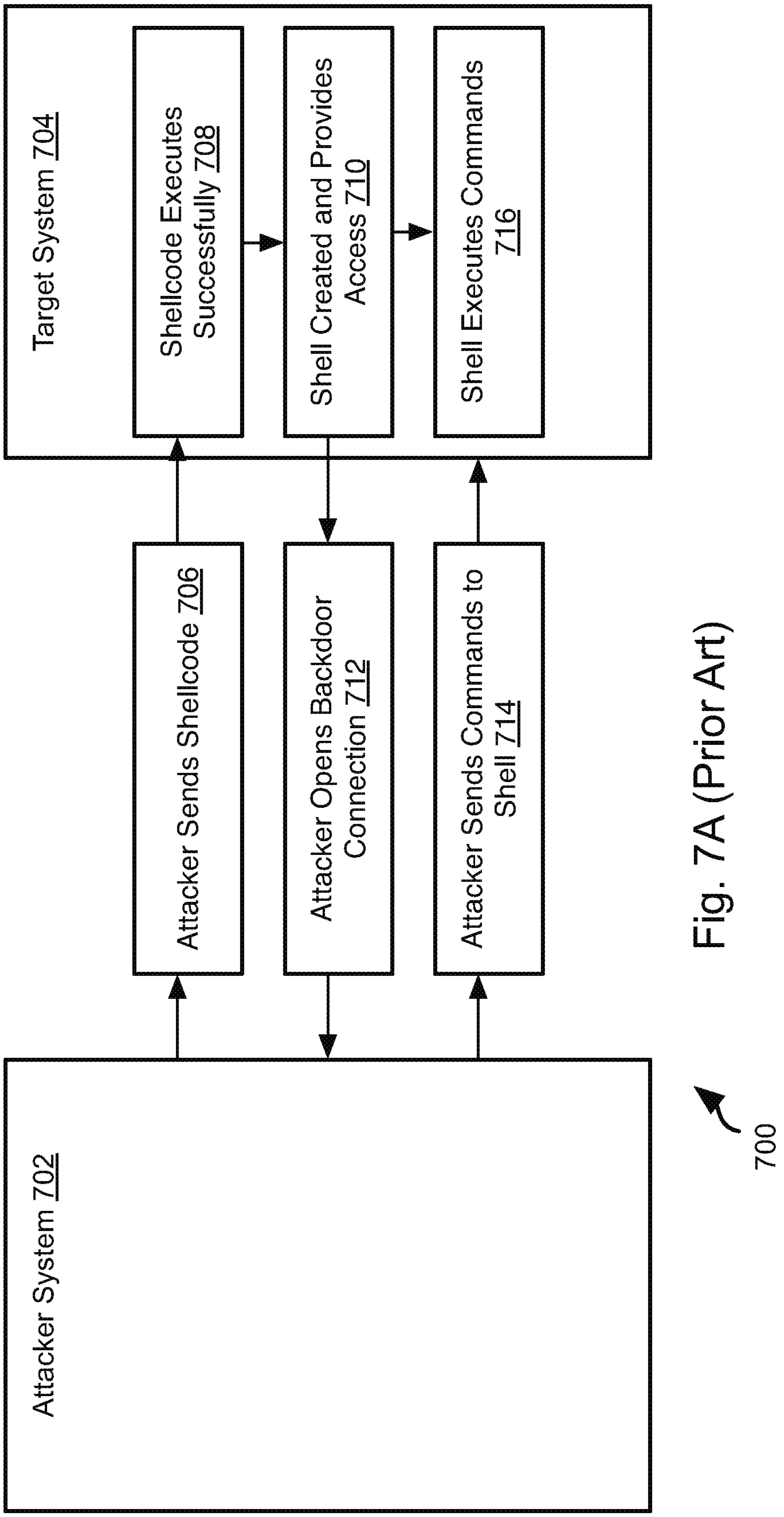
FIG. 7A is a process flow diagram of a successful shellcode attack in accordance with the prior art.

Some or all other security appliance/components existing in a network can be configured to drop and/or quarantine any traffic originating from any of the IP addresses that have been assigned to the BotSink Appliance 300. In some embodiments, a signature or schema generated according to the methods described hereinabove may be formatted and contain some or all of the types of data in the example schema shown in FIGS. 6A and 6B. An understanding of the context in which the novel methods described herein may be applied can be found in the following articles, which are hereby incorporated herein by reference as constituted on May 2, 2014:

https://www.gosquared.com/blog/how-to-stop-a-botnet-attack http://www.darkreading.com/risk/up-to-9-percent-of-machines-in-an-enterprise-are-botinfected/d/d-id/1132015?

http://rise.cse.iitm.ac.in/wiki/images/9/98/Botnet_report.pdf http://www.cms.livjm.ac.uk/pgnet2012/Proceedings/Papers/1569604821.pdf Referring to FIG. 7A, as described in the "Background" section, an attacker may attempt to upload "shellcode" to a computer system. A remote shellcode is successful only when the attacker finds the correct vulnerable application and version to exploit. It is not practically possible to deploy every version of the application in production environment. Accordingly, some shellcode attacks fail due to the target system lacking an exploitable application. If unsuccessful, a received shellcode may remain dormant and try other methods to exploit vulnerable systems, such as servers. For example, Nginx is a popular web server that can be exploited by means of buffer overflow (CVE-2013-2028) in versions 1.3.9 and 1.4.0. An attacker targeting these versions might be successful. However, the current Nginx version is 1.4.7 and is not vulnerable to exploits documented in CVE-2013-2028.

The systems and methods described herein provide an improved approach for preventing shellcode attacks. In particular, shellcode attacks may be made to appear successful in order to gather information regarding the attack. As described hereinabove, a BotMagnet 180 may implement one or more VMs hosting GuestOSs that attract Bots and allow themselves to be infected. In the case of a shellcode attack, the attack may not be successful if an application or service (or version thereof) that is the target of the attack is not installed in the GuestOS. Accordingly, opportunities to gather information about a shellcode may be missed in such instances. Accordingly, the following methods and systems may be used to facilitate simulated infections with a shellcode without requiring that a target application or service actually be installed in a GuestOS.

As shown in the environment 700 of FIG. 7A, a typical shellcode attack may be invoked by an attacker system 702 against a target system 704. The actions taken by the attacker system 702 as described herein may be invoked according to human inputs or be performed by a Bot or some other computerized process. A shellcode attack may be invoked by the attacker sending 706 the shellcode to the target system 704, such as over a network connection, port, or other means. The shellcode may be embedded in otherwise innocuous communication. The manner in which the shellcode gains access to and installs itself on the target system 704 may be according to any known method and will depend on the application or service that is being exploited by the shellcode. The shellcode sent at step 706 may include the executable code of the shellcode, i.e. code effective to install a shell program for invoking a remotely accessible shell. Alternatively, the code downloaded at step 706 may include code effective to retrieve such a shell program from a remote source.

Upon being received by the target system 704 the target system 704 may execute 708 the shellcode, such as embedded within executable code of an exploitable application or service. The manner in which the shellcode is installed and invoked on the target system 704 may be according to any method known in the art and will depend on the application or service being exploited. The shellcode may then create 710 a shell instance and provide access to the shell instance to the attacker system 702. For example, the shellcode may open 712 a backdoor connection to the attacker system 702. As noted above, there are two ways the attacker may open 712 a backdoor connection with the target system 704: (a) the attacker exploits and drops a shellcode known as bindshell where the shellcode binds to a certain port the attacker can connect to (b) The attacker exploits and drops a shellcode known as reverse shell which proactively connects back to attacker's machine. The systems and methods disclosed herein are not specific to bind and connect shells only. For example, the systems and methods disclosed herein may also emulate successful IRC Bot and HTTP(S) Bot attacks. Systems and methods disclosed herein may emulate any attack that downloads and executes a binary and any other method that invokes a command and control (C&C) traffic carrier on a target system.

In either case, the attacker system 702 then sends 714 commands to the shell code instance created at step 710, which then executes 716 the commands. The commands may include any commands that are executable by the target system 704, e.g. system calls, file system operations (navigation or reading, writing, and deleting files), network operations, or other computer executable instructions.

Figure 7B:
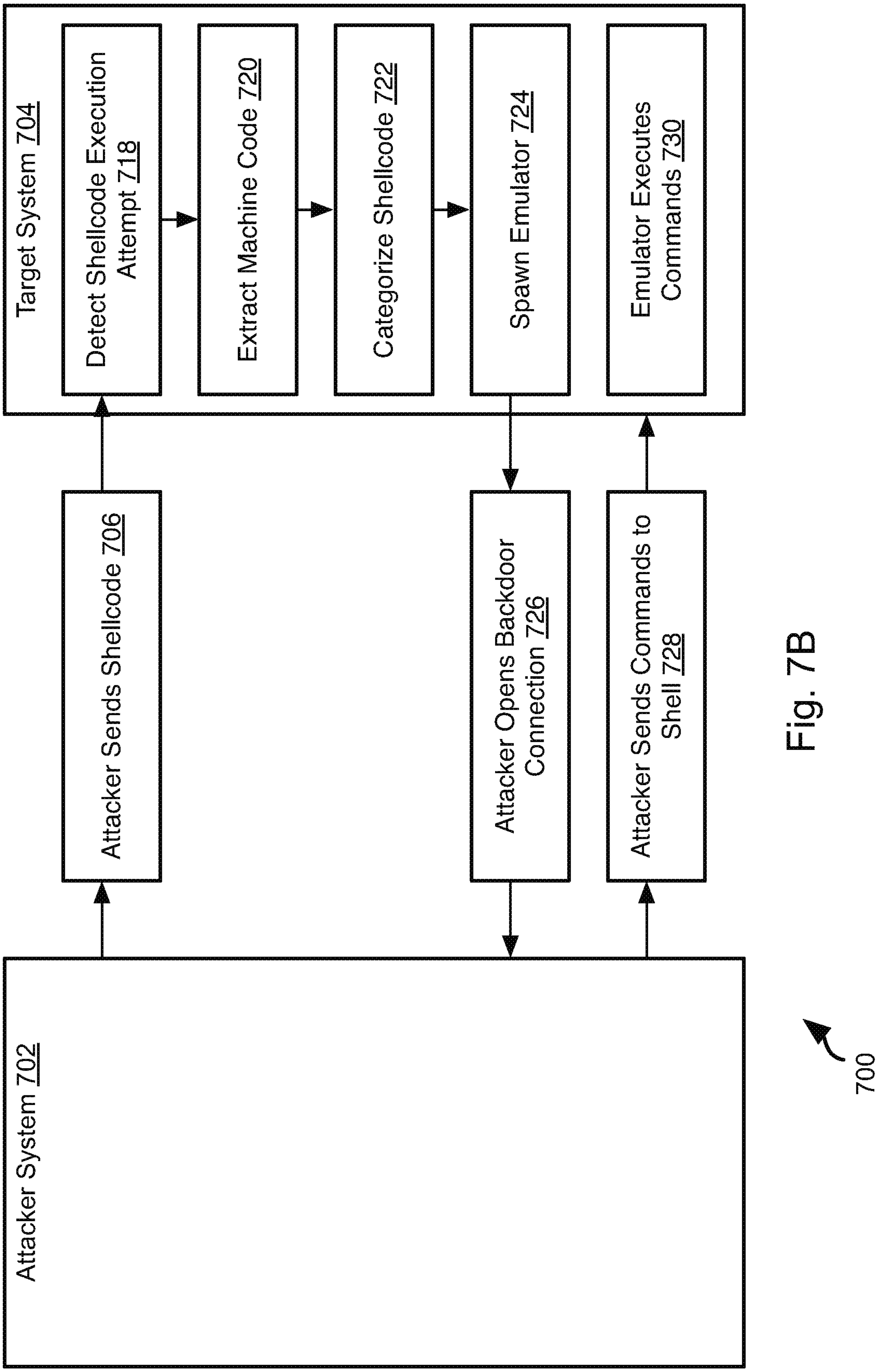
FIG. 7B is a process flow diagram of a method for responding to a shellcode attack in accordance with an embodiment of the present invention.

Referring to FIG. 7B, the environment 700 may respond to a shellcode attack as illustrated in some embodiments. For example, the attacker system 702 may send 706 a shellcode attack in a conventional manner, such as described above with respect to FIG. 7A. On the target system 704, the attempt to execute the shellcode is detected 718. In particular, a failed attempt to execute the shellcode is detected 718. For example, one service that might be exploited is the secure shell (SSH) service. Some versions of SSH may be vulnerable to attack while others are not. Accordingly, an attempt may be made to execute a shellcode by exploiting the SSH service. The executable code implementing the SSH service may be modified to detect a shellcode execution attempt whether or not successful. The executable code for other services may likewise be modified to detect shellcode execution attempts. For example, heuristics may be used. For example, if a number of binary characters are received where printable text characters are expected, it may be determined that the data is suspicious. Accordingly, the data may be evaluated to determine if it is or is not a shellcode.

In response to detecting 718 the attempt, the content of the shellcode may be extracted 720. In particular, the assembler code or other computer instructions of the shellcode may be extracted, e.g. decompressed or otherwise extracted from a received file. This extracted code may be used to characterize 722 the shellcode. For example, the extracted code may be compared to a library of shellcodes to determine a closest match. For example, a hash or some other transformation of the extracted code may be used to generate a signature, which is then compared to signatures in the library to determine a closest match, if any.

If a match is found, then an emulator may be spawned 724, e.g. instantiated and executed. The emulator may correspond to the category or type determined at step 722. That is, the emulator may respond to instructions in a same manner as a shellcode of the determined type. The emulator may then perform steps in order to open 726 a backdoor connection to the attacker system 702, such as either of bindshell or reverse shell as described above with respect to step 712.

Using that backdoor connection, the attacker system 702 may send 728 commands to the emulator in the same manner as described above with respect to step 714 of FIG. 7A. The emulator may execute 730 received commands. Where the target system is a BotMagnet 180 or other VM that is intentionally allowed to be infected, the instructions may simply be executed without modification, inasmuch as the BotMagnet 180 or other VM is insulated from affecting other parts of a corporate network. In other embodiments, instructions may instead be logged without executing them. Responses to instructions may be returned to the attacker system 702 either without modification or with modification to remove sensitive information from responses.

Some or all of the following information may be gathered from instructions received by the emulator: connections (e.g. network data) from the attacker system 702 to the emulator shell; file system activity (directory access, file read, file write, file delete, etc.); all process activity of the incoming instructions from the attacker system 702; and all system calls of all processes spawned in response to instructions by the attacker system 702.

Figure 8:
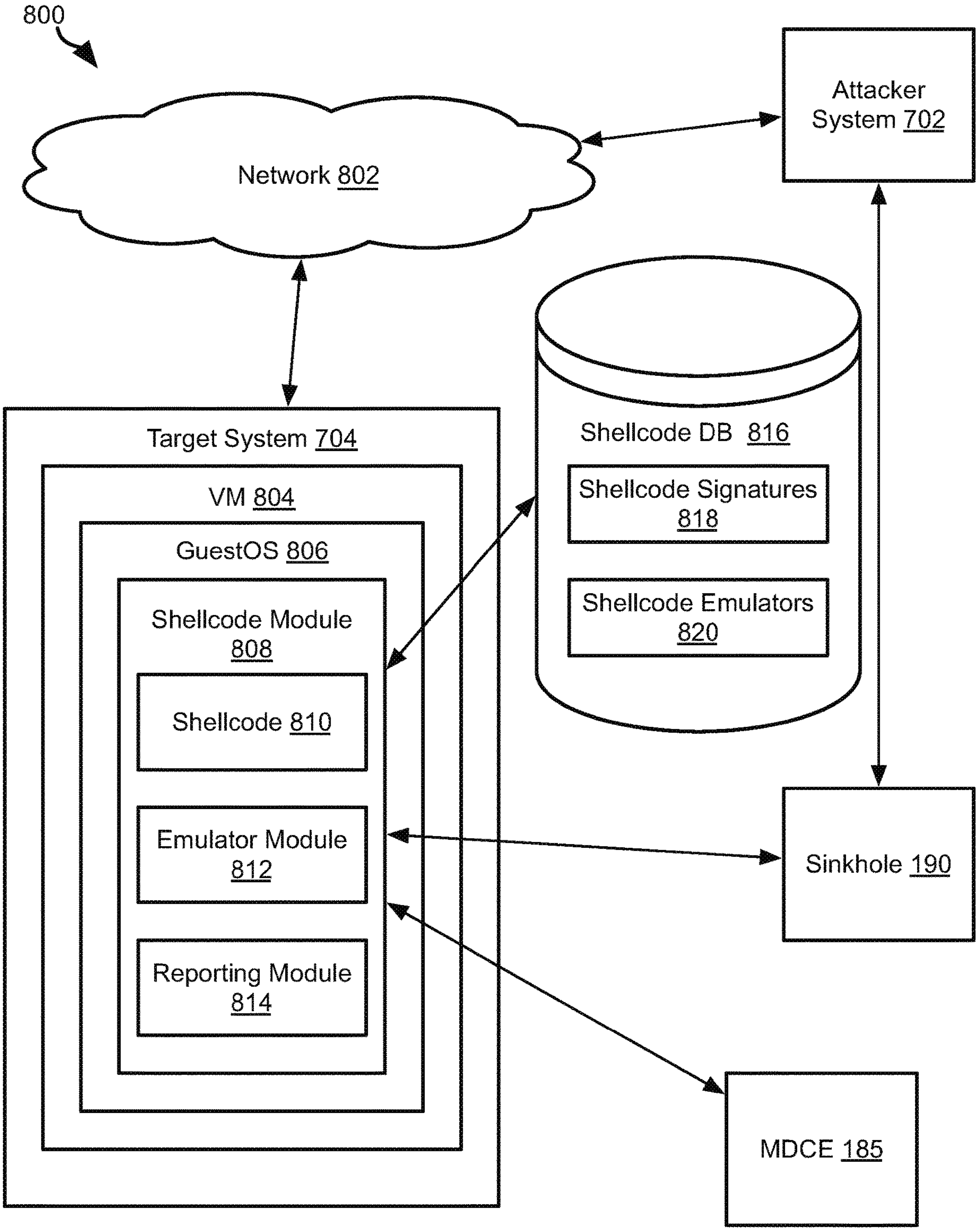
FIG. 8 is a schematic block diagram of an environment for responding to shellcode attacks in accordance with an embodiment of the present invention.

FIG. 8 illustrates an expanded or alternate environment 800 in which methods in accordance with an embodiment of the invention may be practiced. As shown, the attacker system 702 and the target system 704 may be in data communication with one another, such as by means of a network 802 connecting the two systems. The network 802 may be a local area network (LAN), wide area network (WAN), the Internet, a peer-to-peer connection, or other type of network or network connection. The network 802 may include a wireless network. The attacker system 702 may also be physically connected to the target system 704 by means of a cable or a physical storage medium coupled to the target system 704.

The target system 704 may implement some or all of the functionality of a BotMagnet 180 or the BotSink appliance 300. Accordingly, the target system 704 may host one or more VMs 806 hosting one or more GuestOSs 806 having some or all of the attributes of the VMs and GuestOSs of a BotMagnet 180 as described hereinabove. The GuestOS 808 may host a shellcode module 808. The shellcode module 808 may be embedded in the executable code implementing an application or service such as file transfer protocol (FTP), secure shell (SSH), simple mail transfer protocol (SMTP), hypertext transfer protocol (HTTP), and network or web services.

The shellcode module 808 during execution of methods as described herein may store or access a shellcode 810 that has been received from an attacker system 702 and is being processed as described herein. An emulator module 812 may analyze the shellcode 810, determine a type or category of the shellcode 810, and implement a corresponding emulator that imitates behavior of the shellcode 810. A reporting module 814 may record instructions received by the emulator module 812 from the attacker system 702 and may further record other actions or system responses to the instructions. The reporting module 814 may report this information to a system administrator or other software module, such as an MDCE 185. The events recorded and reported by the reporting module 814 may include some or all of the events reported to an MDCE by any of the embodiments of a BotMagnet, VM, and/or GuestOS as described above.

To shellcode module 810 may include or access a shellcode database 816. The shellcode database may store actual shellcodes or signatures 818 of shellcodes that have previously been identified by any means such as any intrusion prevention system (IPS), human directed analysis of an infected system, or any other means known in the art.

The shellcode database 816 may further store a plurality of shellcode emulators 820, such as a shellcode module 818 corresponding to each shellcode signature 818. The shellcode module may include executable and operational code for mimicking the behavior of a corresponding shellcode, i.e. for producing a response to the same instruction set as the corresponding shellcode. The actual actions taken by the emulator 820 in response to these same instructions may be the same or different. For example, an emulator 820 may execute the instruction in the same manner but take additional actions such as record the instructions and data regarding the instruction (time received, source URL, etc.). The emulator 820 may execute some or all of the instructions in a different, such as by refraining from accessing or sharing sensitive information and/or providing bogus data in response to such requests.

In some embodiments, outbound traffic from the emulator 812 in response to received instructions may be transmitted to a Sinkhole 190 for processing as described hereinabove. The Sinkhole 190 may further process the outbound traffic in proxy mode as described hereinabove and forward the outbound traffic, such as with some transformations, to the attacker system 702 in the same manner as described hereinabove with respect to the proxy mode of the Sinkhole 190.

Figure 9:
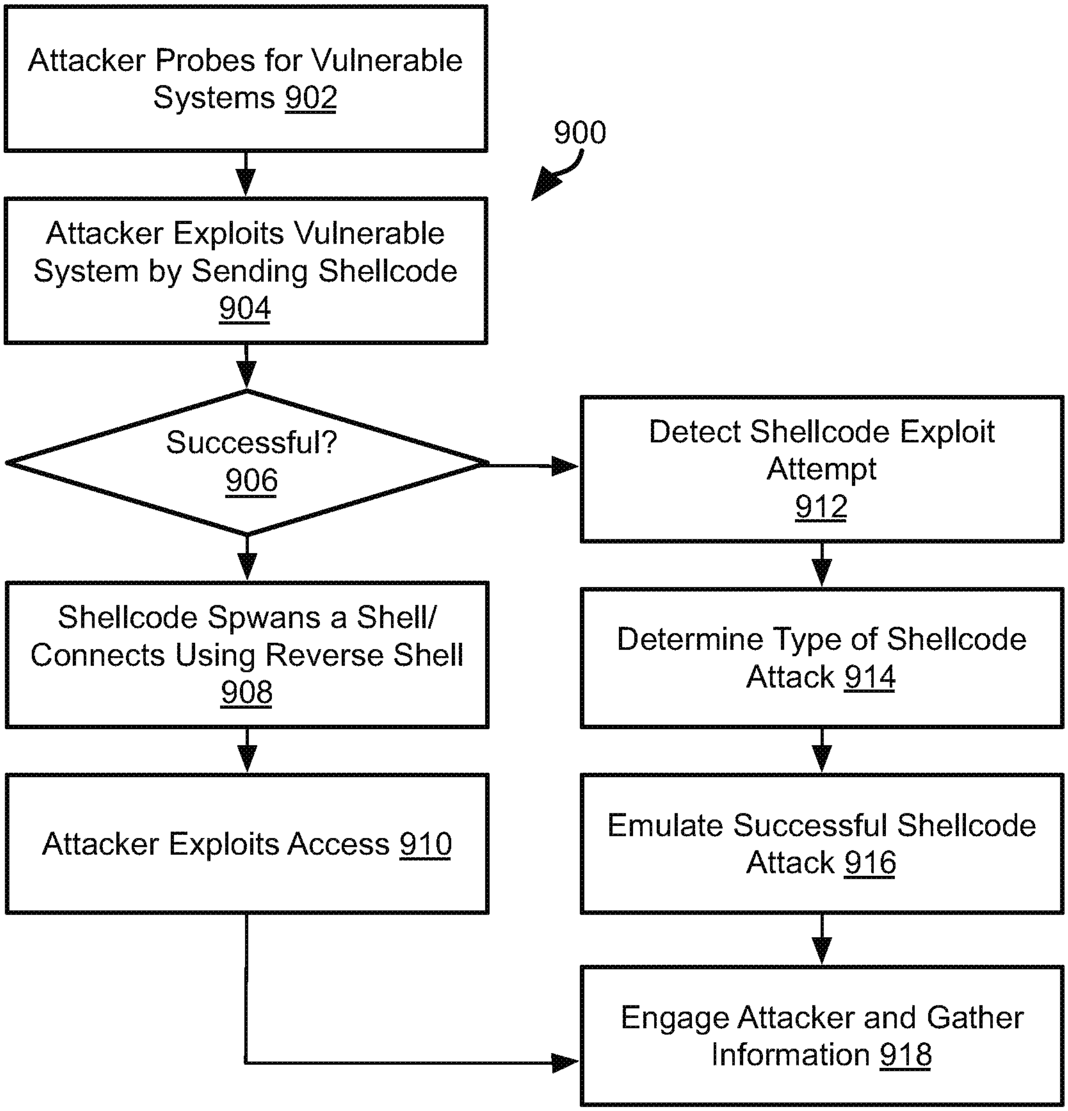
FIG. 9 is a flowchart illustrating a method for responding to a shellcode attack in accordance with an embodiment of the present invention.

FIG. 9 illustrates a method 900 that may be executed on a target system, such as by a BotMagnet, VM 804, GuestOS 806, and/or shellcode module 808. The method of claim 900 may include probing 902 a network by an attacker system 702 to identify a vulnerable system, such as the target system 704. The attacker system 702 may attempt to exploit a vulnerable system, such as the target system 704, by sending 904 a shellcode. Sending a shell code may include transmitting the shellcode to a vulnerable application or service executing on the target system 704.

If the attack is found 906 to be successful, then the shellcode sent at step 904 spawns 908 a shellcode instance and connects to the attacker system 702 using a bindshell available for accepting instructions from the attacker system or a reverse shell that transmits access information to the attacker system 702 as described above. The attacker then exploits 910 this access by issuing instructions to the shellcode instance. Steps 908, 910 may be performed within a BotMagnet and therefore the shellcode may be prevented from doing any actual harm to a computer system and actions taken by the shellcode are recorded and reported as described above.

If the attack is found 906 not to have been successful, rather than simply ignore the attack, the method 900 may advantageously simulate behavior of a successful attack in order to gather information about the shellcode attack. This advantageously does not require the target system 704 to have every possible vulnerable application or service installed in order to gather information about a corresponding shellcode attack.

For example, the method 900 may include detecting 912 the attempt to install a shell code and determining 914 the type of shellcode attack. As noted above, determining 914 the type of shellcode attack may include comparing the data received from the attacker system 702 to a database 818 of shellcodes or shellcode signatures. For example, the assembler code defining a shellcode may be extracted and input to a hash function to obtain a signature. This signature may then be compared to the shellcode signatures 818 to identify a match.

An emulator corresponding to the matching signature may then emulate 916 a successful shellcode attack. This may include binding to an appropriate port for the received shellcode and/or sending access information to the attacker system 702, as would the received shellcode if it had been successful.

If the shellcode attack is successful or unsuccessful, the method 900 may include engaging 918 the attacker and gathering information, either from instructions issued to and actions taken by the successfully installed shellcode or from instructions issued to and actions taken by the emulator.

Figure 10:
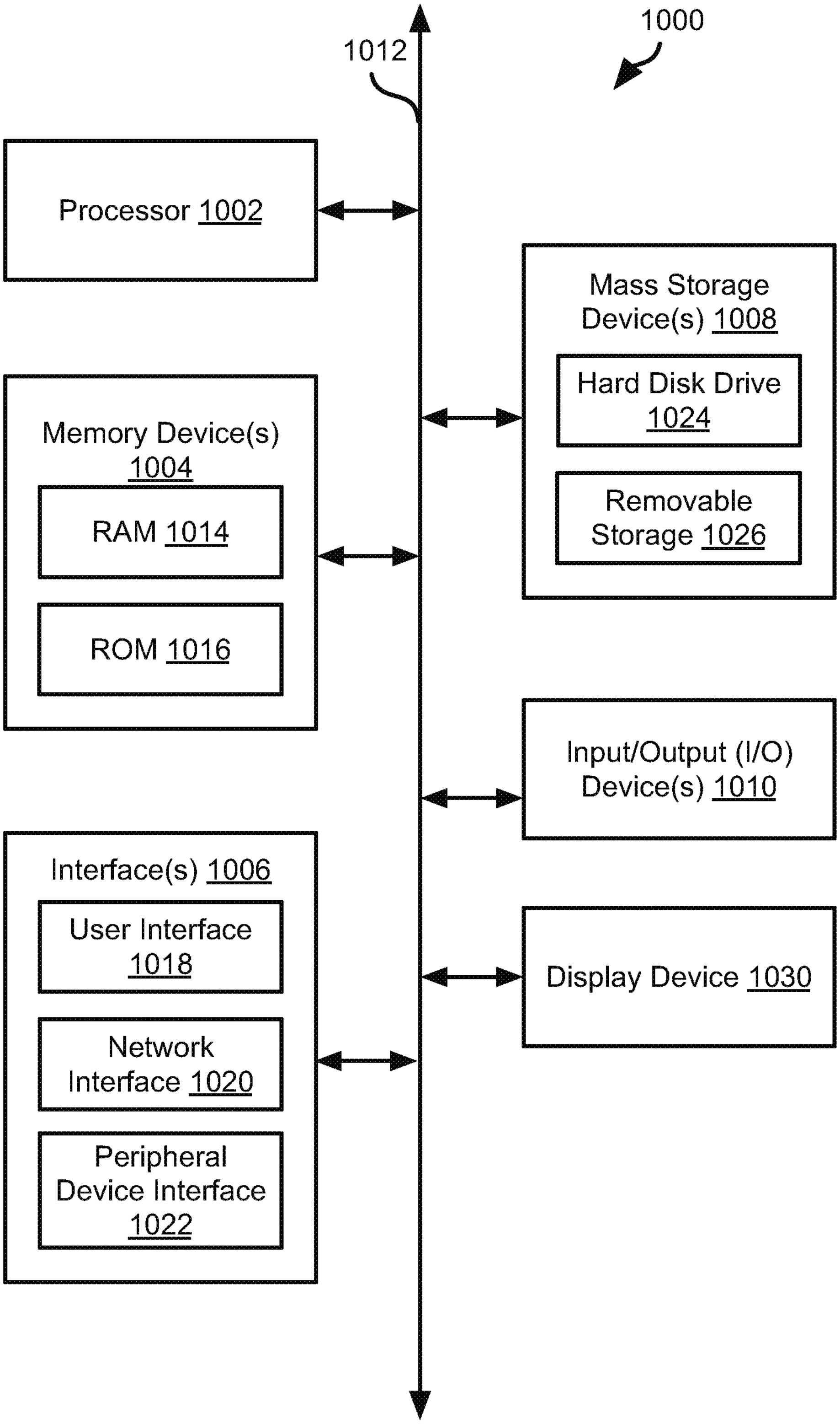
FIG. 10 is a schematic block diagram of a computing device suitable for implementing methods in accordance with an embodiment of the present invention.

FIG. 10 is a block diagram illustrating an example computing device 1000 which can be used to implement the BotMagnet 180, the MDCE 185, 187, or 188, the Sinkhole 190, the Management Server or Monitor 195, the BotSink Appliance 300, attacker system 702, or target system 704. In some embodiments, a cluster of computing devices interconnected by a network may be used to implement these components of the invention. For example, a cluster could be used for large-scale services such as a higher-level MDCE 187 or a "global" MDCE 188. This could also be true for the Sinkhole 190, which could be a cluster/service shared by all of the BotMagnets 180 in a local network.

Computing device 1000 may be used to perform various procedures, such as those discussed herein. Computing device 1000 can function as a server, a client, or any other computing entity. Computing device can perform various monitoring functions as discussed herein, and can execute one or more application programs, such as the application programs described herein. Computing device 1000 can be any of a wide variety of computing devices, such as a desktop computer, a notebook computer, a server computer, a handheld computer, tablet computer and the like.

Computing device 1000 includes one or more processor(s) 1002, one or more memory device(s) 1004, one or more interface(s) 1006, one or more mass storage device(s) 1008, one or more Input/Output (I/O) device(s) 1010, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 10, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 include any number of different network interfaces 1020, such as interfaces to local area networks (LANs), wide area networks (WANs), wireless networks, and the Internet. Other interface(s) include user interface 1018 and peripheral device interface 1022. The interface(s) 1006 may also include one or more user interface elements 1018. The interface(s) 1006 may also include one or more peripheral interfaces such as interfaces for printers, pointing devices (mice, track pad, etc.), keyboards, and the like.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1000, and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed is:

1. A method comprising:

receiving, by a target system from an intruder system, a shellcode including executable and operational instructions effective, when executed, to cause vulnerable software to receive and execute instructions using the shellcode, the vulnerable software including at least one of a service and an application, the target system not hosting the vulnerable software;

detecting, by the target system, failure of installation of the shellcode on the target system; and in response to detecting failure of installation of the shellcode on the target system, performing (a) through (g), wherein (a) through (g) include (a) identifying, by the target system, a type of the shellcode;

(b) selecting, by the target system, a shellcode emulator corresponding to the type of the shellcode, the target system not being vulnerable to the type of the shell code;

(c) at least one of (i) binding the shellcode emulator to a port indicated by the shellcode and (ii) connecting the shellcode emulator to the intruder system;

(d) receiving, by the target system, instructions from the intruder system directed to the shellcode, the shell code having failed to install on the target system;

(e) executing, by the target system, the instructions by the shellcode emulator effective to simulate successful installation of the shellcode;

(f) characterizing, by a detection system, behavior of the shellcode according to the instructions to generate a shellcode characterization; and (g) transmitting, by the detection system, the characterization to a plurality of computer systems.

2. The method of claim 1, further comprising, wherein characterizing behavior of the shellcode according to the instructions comprises recording one or more of:

network connections invoked by the instructions;

file system activities invoked by the instructions;

process activities invoked by the instructions; and system calls invoked by the instructions.

3. The method of claim 1, further comprising:

detecting, by the target system, outbound traffic from the shellcode emulator invoked by the instructions;

in response to detecting outbound traffic invoked by the instructions, transmitting, by the target system, the outbound traffic to a sinkhole module;

processing, by the sinkhole module, the outbound traffic and returning a response to the shellcode emulator.

4. The method of claim 1, further comprising:

detecting, by the target system, outbound traffic from the shellcode emulator invoked by the instructions;

identifying a service requested by the outbound traffic;

instantiating a sinkhole module and provisioning the sinkhole module with the service in response to detecting the outbound traffic and identifying the service; and processing, by the sinkhole module, the outbound traffic and returning a response to the shellcode emulator.

5. The method of claim 1, further comprising binding an instance of the shellcode emulator to a port of the target system;

wherein receiving the instructions from the intruder system comprises receiving the instructions at the port.

6. The method of claim 1, further comprising:

transmitting access information for an instance of the shellcode emulator executing on the target system to the intruder system.

7. The method of claim 1, wherein identifying the type of the shellcode comprises evaluating a signature of data constituting the shellcode.

8. The method of claim 1, wherein identifying the type of the shellcode comprises evaluating assembler code of the shellcode.

9. The method of claim 1, wherein the target system executes a secure service operable to accept requests to create a secure connection to a remote system, authenticate a user on the remote system, and execute instructions from the user; and wherein the secure service performs all of determining blocking of installation of the shellcode on the target system, identifying a type of the shellcode, receiving instructions from the intruder system, and executing, by the target system, the instructions by the shellcode emulator.

10. The method of claim 1, wherein selecting the shellcode emulator corresponding to the type comprises retrieving a definition of the shellcode emulator from a database storing a plurality of shellcode definitions.

11. A system comprising one or more processors and one or more memory devices storing executable and operational code, the executable and operational code effective to cause the one or more processors to:

receive, from an intruder system, a shellcode including executable and operational instructions effective, when executed, to cause the target system to execute a shell for receiving and executing instructions on the target system;

determine failure of installation of the shellcode on the target system due to the target system not being vulnerable to the shellcode; and in response to failure of installation of the shellcode on the target system performing (a) through (f), wherein (a) through (f) include (a) identify a type of the shellcode;

(b) select a shellcode emulator corresponding to the type of the shellcode;

(c) receive instructions from the intruder system directed to the shellcode, the shellcode not installed on the system;

(d) execute the instructions by the shellcode emulator;

(e) characterize behavior of the shellcode according to the instructions to generate a shellcode characterization; and (f) transmit the characterization to a plurality of computer systems.

12. The system of claim 11, wherein the executable and operational code are further effective to cause the one or more processors to characterize behavior of the shellcode according to the instructions by recording one or more of:

network connections invoked by the instructions;

file system activities invoked by the instructions;

process activities invoked by the instructions; and system calls invoked by the instructions.

13. The system of claim 11, wherein the executable and operational code are further effective to cause the one or more processors to:

detect outbound traffic from the shellcode emulator invoked by the instructions;

in response to detecting outbound traffic invoked by the instructions, transmit the outbound traffic to a sinkhole module;

process the outbound traffic and returning a response to the shellcode emulator.

14. The system of claim 11, wherein the executable and operational code are further effective to cause the one or more processors to:

detect outbound traffic from the shellcode emulator invoked by the instructions;

identify a service requested by the outbound traffic;

instantiate a sinkhole module and provisioning the sinkhole module with the service in response to detecting the outbound traffic and identifying the service; and process, by the sinkhole module, the outbound traffic and return a response to the shellcode emulator.

15. The system of claim 11, wherein the executable and operational code are further effective to:

cause the one or more processors to bind an instance of the shellcode emulator to a port of the target system;

receive the instructions from the intruder system by receiving the instructions at the port.

16. The system of claim 11, wherein the executable and operational code are further effective to cause the one or more processors to:

transmit access information for an instance of the shellcode emulator executing on the target system to the intruder system.

17. The system of claim 11, wherein the executable and operational code are further effective to cause the one or more processors to identify the type of the shellcode by evaluating a signature of data constituting the shellcode.

18. The system of claim 11, wherein the executable and operational code are further effective to cause the one or more processors to identify the type of the shellcode by evaluating assembler code of the shellcode.

19. The system of claim 11, wherein the executable and operational code are further effective to cause the one or more processors to execute a secure service operable to accept requests to create a secure connection to a remote system, authenticate a user on the remote system, and execute instructions from the user; and wherein the secure service includes executable and operational code effective to perform all of determining blocking of installation of the shellcode on the target system, identifying a type of the shellcode, receiving instructions from the intruder system, and executing, by the target system, the instructions by the shellcode emulator.

20. The system of claim 11, wherein the executable and operational code are further effective to cause the one or more processors to select the shellcode emulator corresponding to the type by retrieving a definition of the shellcode emulator from a database storing a plurality of shellcode definitions.

* * * * *